United States Patent
Rajendran et al.

(10) Patent No.: US 12,200,493 B2
(45) Date of Patent: Jan. 14, 2025

(54) SOURCE BASE STATION, UE, METHOD IN WIRELESS COMMUNICATION SYSTEM

(71) Applicant: NEC Corporation, Tokyo (JP)

(72) Inventors: Rohini Rajendran, Tamil Nadu (IN); Pradheep Kumar Singaravelu, Tamil Nadu (IN); Nivedya Parambath Sasi, Tamil Nadu (IN); Takahito Yoshizawa, Heidelberg (DE); Sivabalan Arumugam, Tamil Nadu (IN); Anand Raghawa Prasad, Tokyo (JP)

(73) Assignee: NEC CORPORATION, Tokyo (JP)

( * ) Notice: Subject to any disclaimer, the term of this patent is extended or adjusted under 35 U.S.C. 154(b) by 421 days.

(21) Appl. No.: 17/421,240

(22) PCT Filed: Dec. 10, 2019

(86) PCT No.: PCT/JP2019/048312
§ 371 (c)(1),
(2) Date: Jul. 7, 2021

(87) PCT Pub. No.: WO2020/145005
PCT Pub. Date: Jul. 16, 2020

(65) Prior Publication Data
US 2022/0060901 A1    Feb. 24, 2022

(30) Foreign Application Priority Data
Jan. 11, 2019    (IN) .............................. 201941001322

(51) Int. Cl.
*H04W 12/122* (2021.01)
*H04W 24/10* (2009.01)
*H04W 76/27* (2018.01)

(52) U.S. Cl.
CPC ......... *H04W 12/122* (2021.01); *H04W 24/10* (2013.01); *H04W 76/27* (2018.02)

(58) Field of Classification Search
CPC ... H04W 12/122; H04W 24/10; H04W 76/27; H04W 36/0088; H04W 36/0094; H04W 88/08; H04W 36/0038
(Continued)

(56) References Cited

U.S. PATENT DOCUMENTS

| | | | |
|---|---|---|---|
| 2007/0005499 A1* | 1/2007 | Gentry | G06Q 40/02 705/51 |
| 2015/0140997 A1 | 5/2015 | Goldfarb | |

(Continued)

FOREIGN PATENT DOCUMENTS

| | | | |
|---|---|---|---|
| WO | 2016096836 A1 | 6/2016 | |
| WO | WO-2018031345 A1 * | 2/2018 | |
| WO | WO-2018194971 A1 * | 10/2018 | ............ H04W 12/06 |

OTHER PUBLICATIONS

International Search Report for PCT Application No. PCT/JP2019/048312, mailed on Mar. 3, 2020.
(Continued)

*Primary Examiner* — Jacob Lipman
(74) *Attorney, Agent, or Firm* — Sughrue Mion, PLLC

(57) ABSTRACT

The method includes: generating, by a source base station, a UE specific Anonymity Challenge Parameter to the UE based on sensitive information from the UE, cell information, source base station information and initial Anonymity Challenge Parameter assigned to the particular base station; and sending, by the source base station, a measurement command message including the UE specific Anonymity Challenge Parameter to the UE. Further, the method includes receiving, by the source base station, an Anonymity Challenge Parameter acknowledgement as a response from the UE; and negotiating, by the source base station, the UE specific Anonymity Challenge Parameter with the UE to prevent the UE from attaching to the false base station.

3 Claims, 24 Drawing Sheets

(58) Field of Classification Search
USPC .......................................................... 726/3
See application file for complete search history.

(56) References Cited

U.S. PATENT DOCUMENTS

| | | | |
|---|---|---|---|
| 2015/0271194 A1 | 9/2015 | Szucs et al. | |
| 2016/0212737 A1* | 7/2016 | Jang | H04L 5/001 |
| 2016/0248686 A1* | 8/2016 | Lee | H04W 4/24 |
| 2016/0309332 A1 | 10/2016 | Norrman et al. | |
| 2016/0381545 A1 | 12/2016 | Wang et al. | |
| 2017/0295489 A1* | 10/2017 | Agiwal | H04W 12/0433 |
| 2019/0387401 A1* | 12/2019 | Liao | H04W 28/0289 |

OTHER PUBLICATIONS

3rd Generation Partnership Project, "Technical Specification Group Services and System Aspects; Procedures for the 5G System; Stage 2 (Release 15)", 3GPP TS 23.502 V15.4.1 (Sep. 2019), pp. 1-347.

3rd Generation Partnership Project, "Technical Specification Group Services and System Aspects; Study on the security aspects of the next generation system (Release 14)", 3GPP TR 33.899 V1.3.0 (Aug. 2017), pp. 1-604.

3rd Generation Partnership Project, "Technical Specification Group Services and System Aspects; System Architecture for the 5G System; Stage 2 (Release 15)", 3GPP TS 23.501 V15.4.0 (Dec. 2018), pp. 1-236.

3rd Generation Partnership Project, "Technical Specification Group Services and System Aspects; Vocabulary for 3GPP Specifications (Release 15)", 3GPP TR 21.905 V15.0.0 (Mar. 2018), pp. 1-65.

Huawei et al., "Aoviding HO caused by fake base station", 3GPP TSG SA WG3 #93 S3-183351, Spokane, USA, Nov. 12, 2018, pp. 1-4.

NEC Corporation, "New solution for preventing UE from attaching to a false base station", 3GPP TSG SA WG3 #94 S3-190352, Kochi, India, Jan. 28, 2019, pp. 1-3.

* cited by examiner

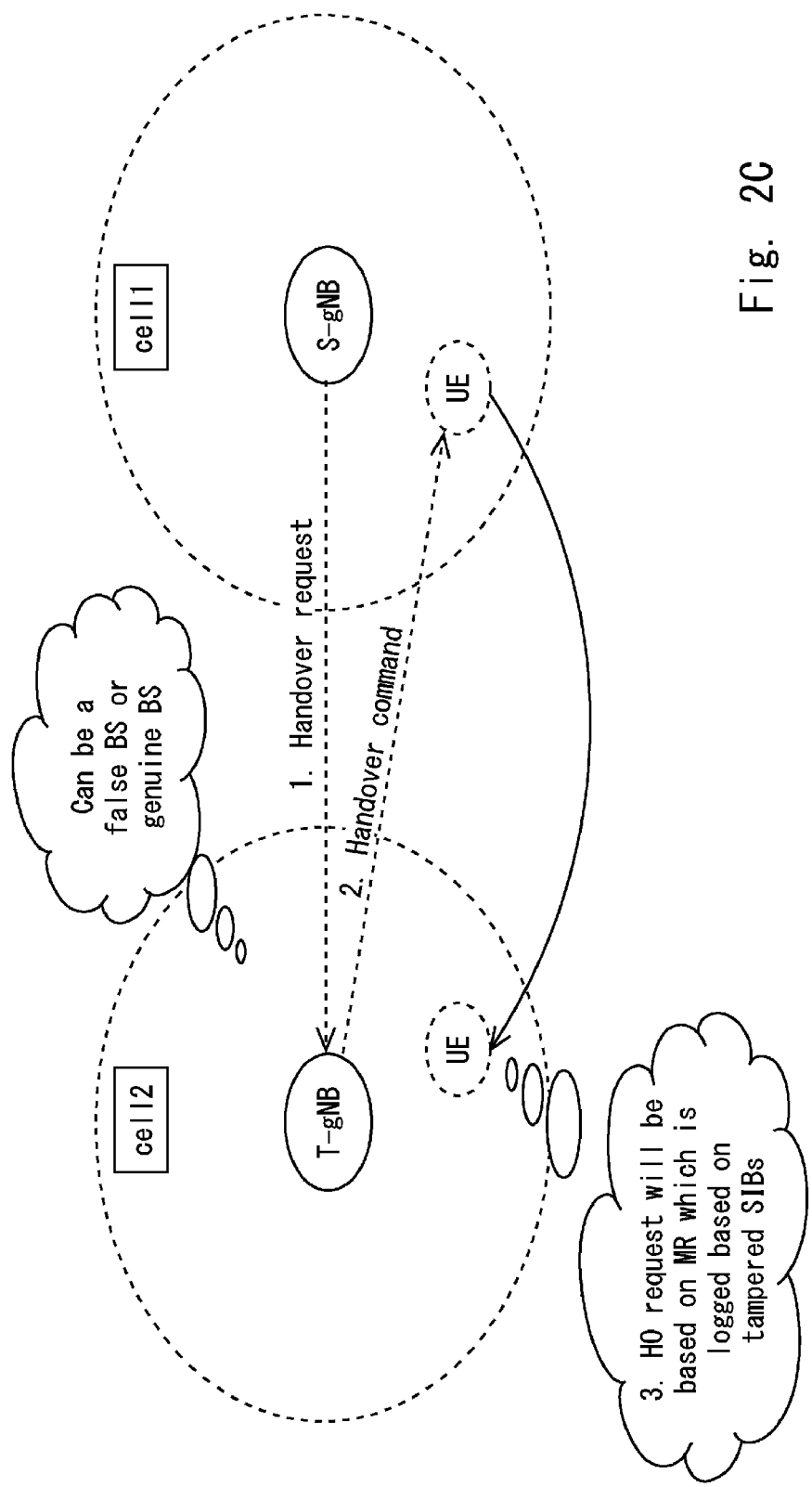

SOURCE BASE STATION, UE, METHOD IN WIRELESS COMMUNICATION SYSTEM

This application is a National Stage Entry of PCT/JP2019/048312 filed on Dec. 10, 2019, which claims priority from Indian Patent Application 201941001322 filed on Jan. 11, 2019, the contents of all of which are incorporated herein by reference, in their entirety.

TECHNICAL FIELD

The present disclosure relates to a source base station, a user equipment, and a method in wireless communication systems such as Long-Term Evolution (LTE), 5G system and next generation wireless communication system.

BACKGROUND ART

System information is divided into a Master Information Block (MIB) and a number of System Information Blocks (SIBs) and System Information Block Pos (posSIBs). The MIB includes a limited number of the most essential and the most frequently transmitted parameters that are needed to acquire other information from the cell, and is transmitted on the Broadcast Channel. In both LTE and 5G system, a User Equipment (UE) acquires system information from a camped cell and uses them to receive paging and obtains other services such as Multimedia Broadcast Multicast Services (MBMS), Device-to-Device (D2D), etc. in a Radio Resource Control (RRC) idle mode. When the UE selects a cell in the RRC idle mode, the UE does not validate the system information block and also does not know whether a gNodeB (gNB) or Evolved Node B (eNB) is authentic or fake. As a result, the UE may camp to a rogue cell leading to denial of services (such as public safety warnings, incoming emergency calls, real-time application server push services, proximity services, etc.). The UE performs the signal power measurement of neighboring cells based on Synchronization Signal Block which carries the synchronization signal and the MIB without security protection. A fake base station which knows a Cell Identifier (ID) of a real base station may impersonate as a real base station and cause handover to the fake base station (i.e., the UE may connect to the false base station).

Existing Xn handover procedure, defined in NPL 1, is used to handover the UE from a source Next Generation Radio Access Network (NG-RAN) to a target NG-RAN using an Xn interface when an Access and Mobility Management function (AMF) is unchanged and a Session Management Function (SMF) decides to keep the existing User Plane Function (UPF). In the pre-existing handover procedure over the Xn interface, a source gNB prepares for the handover as soon as it receives the measurement report from the UE. According to the measurement report, the source gNB sends a handover request to the target gNB which has the highest signal strength. The problem arises when the measurement report is manipulated. This manipulation can happen only when the UE is in the idle mode and receives the unprotected broadcast messages from the gNB. When the UE is in the idle mode, the UE receives the SIBs broadcasted by the gNB present in the cell to which the UE camped. As the SIBs are sent before security activation, there is a possibility that a false base station can masquerade the SIB. During a connected mode, the handover decision is made based on the measurement report which the UE logs when it was in the idle mode. The UE will log the measurement report based on the received SIB without knowing that it has been tampered.

FIG. 1A illustrates a fake base station attack scenario when the attacker (fake base station) is present in the same cell. As illustrated in the FIG. 1A, the scenario is as follows:
1. The gNB broadcasts the SIB to all the UEs (UE1, UE2, and UE3) present in the cell.
2. Considering a scenario where exists a false base station which may masquerade the broadcasted system information block.
3. The UE, unaware of the presence of the fake base station, may log measurement report based on the masqueraded system information block and the logged measurement report may be sent to the fake base station.

FIG. 1B illustrates a fake base station attack scenario when the attacker (fake base station) is present in a different cell. As illustrated in the FIG. 1B, the scenario is as follows:
1. The gNB broadcasts the SIB to all the UEs present in the cell.
2. Considering a scenario where exists a false base station which may eavesdrop.
3. The false base station masquerades the broadcasted SIB.
4. The UE unaware of the presence of the false base station may log the measurement report based on the masqueraded SIB.
5. Based on the measurement report, the source base station may initiate the handover request to the attacker (fake base station) which is impersonating as a genuine base station.
6. The UE may get attached to the fake base station which may provide downgraded services to the UE.
7. The fake base station may send the handover command to the UE.
8. The fake base station may provide downgraded services to the UE.

CITATION LIST

Patent Literature

PTL 1: US2016/0381545A1
PTL 2: US2015/0140997A1
PTL 3: WO2016/096836A1
PTL 4: US 2015/0271194A1

Non Patent Literature

NPL 1: 3GPP TS 23.502, "Procedures for the 5G System (5GS)"
NPL 2: 3GPP TR 33.899, "Study on the security aspects of the next generation system"
NPL 3: 3GPP TS 23.501, "System Architecture for the 5G System"
NPL 4: 3GPP TR 21.905: "Vocabulary for 3GPP Specifications". V15.0.0

SUMMARY OF INVENTION

Technical Problem

Therefore, a first problem is lack of proper verification of the base station before handover and unprotected SIBs. For example, a UE in an idle mode may log the measurement report based on the tampered System Information Block.

When handover is required by a UE, the source base station may send the handover request to the target base station (which may be fake) based on the measurement report logged using the tampered system information block. If the UE gets attached to a false base station, the UE may be provided downgraded services (LTE services) by the fake base station or UE's subscription data and location information may become vulnerable.

A second problem is lack of mechanism to detect and isolate the fake base station. Once the UE or the genuine base station determines that a particular base station is fake, the other UEs or genuine base stations may not know about the determined fake base station. An undetected false base station may lead to downgraded services (bidding down attacks).

FIG. 2A illustrates system information verification using digital signatures, according to the related arts. In network signs selected signaling message as per clause 5.4.4.1 of NPL 2, next generation networks need to have private keys, and UEs can obtain the corresponding public keys and verify their authenticity. The network then uses the private key to append a digital signature to sensitive (broadcast or UE-specific) downlink signaling messages, and the UE can verify the authenticity of those messages. This prevents a false network from spoofing those messages successfully. The mechanism is mandatory to implement and mandatory to use in networks. It is optional to support and optional to use in UEs. Legacy UEs, or UEs for which signature verification would be in some sense too demanding, can ignore the appended signatures and treat all network messages as genuine.

Provisioning and management of keys:

This solution requires one or more global Certification Authorities (CAs). Each network needs to have a root key pair, with the public key certified by one of the CAs.

All CA root public keys should be programmed into each UE that supports this solution. These root keys could in principle be either in the USIM (or its NextGen equivalent) or in the ME. The solution proposed is as follows:

The UE first looks for three lists on the USIM:

A list of Permitted CA Certificates. Each entry on this list is a full root certificate.

A list of Forbidden CA Certificates. Each entry on this list is an unambiguous certificate identifier.

A list of Forbidden Network Certificates. Each entry on this list is an unambiguous certificate identifier.

Dependent on what lists are present on the USIM, the UE may also look for lists on the ME, as follows:

If there are no Permitted CA Certificates listed on the USIM (either no file or an empty file) then the UE looks for a list of Permitted CA Certificates on the ME.

If there are no Forbidden CA Certificates listed on the USIM (either no file or an empty file) then the UE looks for a list of Forbidden CA Certificates on the ME.

If there are no Forbidden Network Certificates listed on the USIM (either no file or an empty file) then the UE looks for a list of Forbidden Network Certificates on the ME.

The UE actions are as follows:

A UE supporting this solution will reject a signaling message that it expects to be signed, unless the following conditions are all true:

the message has a signature that the UE can verify using a Network Node Public Key;

the Network Node Public Key has a certificate that the UE can verify a Network Public Key;

the Network Public Key has a certificate that the UE can verify using a root CA certificate in its Permitted CA Certificates list;

the root CA Certificate is not in the UE's Forbidden CA Certificates list;

the Network Certificate is not in the UE's Forbidden Network Certificates list.

If the UE rejects a message then it does so silently, with no error message being returned.

Further, in PTL 1, a method for detecting a fake base station is disclosed. The method in PTL 1 includes identifying multiple parameters associated with a discovery signal transmitted by a second wireless device, the second wireless device advertising as a base station controller (BSC). The first wireless device compares multiple parameters with a set of parameters assigned to, or associated with a cluster of BSs and determines that the second wireless device is a fake base station when an inconsistency between the multiple parameters and the set of parameters associated with the cluster of neighboring BSs exceeds a threshold.

The method further includes determining a power threshold and a minimum lifetime duration assigned to, or otherwise associated with, a cluster of neighboring BSCs. The second wireless device is a faked base station when a received power level of the discovery signal exceeds the power threshold and a lifetime of the discovery signal fails to exceed the minimum lifetime duration. Intelligence and machine learning technologies may be utilized to analyze data collected from different sources to detect and locate a fake base station. Intelligence analytics is used to detect and predict the fake base station with information collected from many sources, including information from the operator's network, operation center customer feedback, mobiles that have a fake BS detection application, short message service center (SMSC) logs, signaling information, and historical data, and correlate collected information with machine learning technology to detect the fake base station. The intelligence analytics may use the information collected from one or more of (1) a potential victim's mobile station, (2) an operator's network, (3) a customer care center, (4) fake BS signal strength and its surrounding environment reported by the mobile network, and (5) history of fake BS information. Further, the discovery signal identifies a location area code (LAC) or a cell identifier (CID) of the second wireless device, and wherein determining that the second wireless device is a fake BS includes: comparing the LAC or the CID of the second wireless devices with a set of LACs or a set of CIDs assigned to, or otherwise associated with, the cluster of neighboring BSs, respectively. The fake base station detection system and methods may be used by an operator to detect and predict a fake base station and to increase the end user quality of experience and to reduce customer churn.

Further, in PTL 2a method verifies that the base station is rogue or innocent by testing the advanced communication features which are supported by the base station. The detection system may have one or more communication features that are supported by innocent base stations and not by a rogue base station. The detection system requests the base station to activate these communication features, during a communication session with a suspected base station (innocent BS or rogue BS). If the suspected base station is unable to perform the requested communication feature, the suspected base station is likely to be a rogue BS. The communication feature includes requesting the base station to provide data service, to activate frequency hopping, to carry out a call setup signaling process, to accept an incoming call, to perform a hand-over process, and/or to activate an Unstructured Supplementary Service Data (USSD) feature. The apparatus includes a transmitter, a receiver and a processor. The processor is configured to predefine at least one communication feature that, when supported by a base station indicates that the base station is innocent and when not supported by the base station indicates that the base station is suspected of being rogue. The presence of a rogue base station is detected by detecting in the communication a signaling message that appears more than once, even though the signaling message is to appear only once in accordance with the communication protocol. Detecting the signaling message includes detecting a duplicate registration process performed using a same Temporary Mobile Subscriber Identity (TMSI), detecting a duplicate call setup process, and/or detecting a duplicate Short Message Service (SMS) transaction.

Further, in PTL 3, a method performed by network node to determine a false base station present in the communications network is disclosed. The class of attacks commonly referred to as false base station attacks includes several different types of attacks. Two important types are the so called the International Mobile Subscriber Identity (IMSI) catcher attack and the Man-ln-The-Middle (MITM) attack. The purpose of the MITM attack is to act as an invisible proxy between the mobile terminal and the network to be able to eavesdrop on the mobile terminals calls. The IMSI catcher attack includes requesting the long term identity from the mobile terminal. The false base station impersonates a legitimate network node towards the mobile terminal. In this method, the network device is served by a network operator in the communication network via a serving Radio Access, RA node. The network also receives a message including measurement reports from the network device based on the configuration. The network node is configured to send a message to a network device, the message includes configuration data for configuring the network device to perform measurements in order to collect information transmitted by network nodes in a surrounding area of the network device. The information transmitted by the network nodes in the surrounding area of the network device may include physical cell identifiers, carrier frequency and/or pilot signal strength. The network node may further configure the network device to measure a large set of frequencies than necessary for a normal operation as well as on a plurality of different Radio Access Technologies (RATs), in order to collect information that may indicate the presence of a false base station. The network node further provides the indication that a false base station is present when a difference between the received information in the measurement report and predetermined target information is detected. The embodiments of the method described have the advantage of cost effective, since the method does not require any hardware communication network but only requiring a software upgrade of these. This allows an operator to collect and analyze data of the network surroundings in order to identify suspicious activity that indicate a false base station, and raise an alarm when suspicious measurements are detected. Further advantage is that they allow a collection of measurements over a large coverage area, since each network device may perform measurements in the networks surroundings of the network device. Hence, a faster and more efficient detection of a false base stations is provided.

Further, PTL 4 aims to provide methods, apparatuses and a program for fake base station detection with core network support and it is proposed to use core network support to increase the reliability of the detection. The core network context information is received from a user equipment or from at least one network element and it is determined at the core network whether the context information received from the user equipment coincides with the context information received from the network element. If coincides, the base station to which the UE is connected is likely to be a valid base station. The apparatus further includes a transmitter configured to transmit a message to the user equipment informing the user equipment whether the base station to which the user equipment is connected is a valid base station or not. PTL 4 provides a way for the user equipment to ensure that it talks to a valid BTS with the help of an operator service, utilizing the additional knowledge at the network side. The problem is to identify whether the UE is connected to a valid base station or not, and PTL 4 proposes many solutions for this. The mobile core networks connection towards the real BTS is hard to be tampered with, so the core network can address the real BTS even if a fake BTS is present in the system. The information about the real base station can come from various sources of the network. The solution is based on a service setup by the operator and an application which needs to be installed in the user equipment, which wishes to use the service. The service requires secure access to the base stations of the operator, a private key of the service and its public key at the application part. One advantage of the solution is that the mobile operator is also informed about these incidents, not only the end user of the UE, enabling further investigations, gathering more evidence or acting against the attackers. PTL 4 is mainly for eavesdropping prevention and impersonation prevention also it is proposed to use the connection characteristics in both the UE side and the BTS side and be compared to each other. An ideal characteristic in PTL 3 is that cannot be faked by an attacker when the UE senses it and its value is known at the network side. Hence the comparison can reveal the fake BTS. A mobile application installed on a user equipment constantly monitors connection and context information from the UE. When the mobile application recognizes a suspicious event, it gets connection and context information from the core network from a network service set up by an operator via a secure channel. In order to determine whether a fake base station is present or not, the mobile application uses the retrieved information.

Furthermore, handover procedures in 3GPP access according to NPL 1 is used to handover a UE from a source NG-RAN node to a target NG-RAN node using the Xn interface. This can be triggered, for example, due to new radio conditions, load balancing or due to specific service, e.g. in the presence of QoS flow for voice, the source NG-RAN node being NR may trigger handover to E-UTRA connected to 5GC.

FIG. 2B illustrates Xn based inter NG-RAN handover, according to the related art. The Xn based inter NG-RAN handover in non-roaming scenario is as follows:

Target NG-RAN to AMF: N2 Path Switch Request (List of PDU Sessions To Be Switched with N2 SM Information, List of PDU Sessions Rejected with for each PDU Session N2 SM Information including a rejection Cause, UE Location Information)

The Target NG-RAN sends an N2 Path Switch Request message to an AMF to inform that the UE has moved to a new target cell and provides a List of PDU Sessions To Be Switched. The selected PLMN ID is included in the message. The target NG-RAN includes the PDU Session in the PDU Sessions Rejected list:

If none of the QoS Flows of a PDU Session are accepted by the Target NG-RAN; or

If the corresponding network slice is not supported in the Target NG-RAN; or

When the NG-RAN cannot set up user plane resources fulfilling the User Plane Security Enforcement with a value required, the NG-RAN rejects the establishment of user plane resources for the PDU Session.

If the NG-RAN cannot set up user plane resources fulfilling the User Plane Security Enforcement with a value preferred, the NG-RAN establishes the user plane resources for the PDU session and includes the PDU Session in the PDU Sessions Modified list.

PDU Sessions Rejected contains an indication that the PDU session was rejected because User Plane Security Enforcement is not supported in the Target NG-RAN. Depending on the type of target cell, the Target NG-RAN includes appropriate information in this message.

For the PDU Sessions to be switched to the Target NG-RAN, the N2 Path Switch Request message includes the list of accepted QoS Flows.

AMF to SMF: Nsmf_PDUSession_UpdateSMContext Request (PDU Session To Be Switched with N2 SM Information, PDU Sessions Rejected with a rejection Cause, UE Location Information, UE presence in LADN service area).

The AMF sends N2 SM information by invoking the Nsmf_PDUSession_UpdateSMContext request service operation for each PDU Session in the lists of PDU Sessions received in the N2 Path Switch Request.

The Nsmf_PDUSession_UpdateSMContext Request contains either an indication that the PDU Session is to Be Switched (together with information on the N3 addressing to use and on the transferred QoS flows) or an indication that the PDU Session is to be Rejected (together with a rejection cause).

For a PDU Sessions to be switched to the Target NG-RAN, upon receipt of the Nsmf_PDUSession_UpdateSMContext request, the SMF determines whether the existing UPF can continue to serve the UE. If the existing UPF cannot continue to serve the UE.

In the case that the AMF determines that the PDU Session is related to a LADN, then the AMF provides the "UE presence in LADN service area" indication to the SMF. If the AMF does not provide the "UE presence in LADN service area" indication and the SMF determines that the DNN corresponds to a LADN, then the SMF considers that the UE is out of the LADN service area. The SMF takes actions for the LADN PDU Session as defined in clause 5.6.5 of NPL 3 based on the "UE presence in LADN service area" indication.

If a PDU Session is indicated as a rejected PDU Session by the Target NG-RAN or AMF without an indication that the PDU session was rejected because User Plane Security Enforcement is not supported in the Target NG-RAN, the SMF decides whether to release the PDU Session or deactivate the UP connections of this PDU Session.

If a PDU Session is indicated as a rejected PDU Session by the Target NG-RAN with an indication that the PDU session was rejected because User Plane Security Enforcement is not supported in the Target NG-RAN and the User Plane Enforcement Policy indicates "Required" as described in clause 5.10.3 of NPL 3, the SMF triggers the release of this PDU Session.

If only partial QoS Flows of a PDU Session are accepted by the Target NG-RAN, the SMF may initiate the PDU Session Modification procedure to remove the non-accepted QoS Flows from the PDU Session(s) after the handover procedure.

For the PDU Session(s) that do not have active N3 UP connections before handover procedure, the SMF(s) keep the inactive status after handover procedure.

If the UE moves into a non-Allowed Area, the AMF also notifies each SMF corresponding to the list of PDU Sessions received from the N2 Path Switch Request that the UE is only reachable for regulatory prioritized services. The SMF then deactivates the PDU Session if this PDU Session is not for the emergency service.

SMF to UPF: N4 Session Modification Request (AN Tunnel Info, CN Tunnel Info)

For PDU Sessions that are modified by the Target NG-RAN, the SMF sends an N4 Session Modification Request message to the UPF. The SMF may notify the UPF that originated the Data Notification to discard downlink data for the PDU Sessions and/or to not provide further Data Notification messages.

Depending on the network deployment, the CN Tunnel Info of UPF used for connection to Target NG-RAN and connection to Source NG-RAN may be different, e.g. due to the Source NG-RAN and the Target NG-RAN are in different IP domains. If the CN Tunnel Info (on N3) of UPF need be re-allocated and the CN Tunnel Info is allocated by the SMF, the SMF provides the CN Tunnel Info (on N3) to the UPF.

UPF to SMF: N4 Session Modification Response (CN Tunnel Info)

For the PDU Sessions that are switched, the UPF returns an N4 Session Modification Response message to the SMF after requested PDU Sessions are switched. Tunnel identifiers for UL traffic are included only for PDU Sessions whose user plane resources are not being released, and only if the UPF allocates CN Tunnel Info and different CN Tunnel Info need be allocated. For the PDU Sessions that are deactivated, the UPF returns an N4 Session Modification Response message to the SMF after the N3 (R)AN tunnel information is released.

In order to assist the reordering function in the Target NG-RAN, the UPF (as specified in NPL 3) sends one or more "end marker" packets for each N3 tunnel on the old path immediately after switching the path. The UPF starts sending downlink packets to the Target NG-RAN.

SMF to AMF: Nsmf_PDUSession_UpdateSMContext Response (CN Tunnel Info)

The SMF sends an Nsmf_PDUSession_UpdateSMContext response (CN Tunnel Info) to the AMF for PDU Sessions which have been switched successfully. The CN Tunnel Info of UPF send to AMF is used to setup N3 tunnel. The SMF sends an Nsmf_PDUSession_UpdateSMContext response without including the CN Tunnel Info to the AMF for the PDU Sessions for which user plane resources are deactivated or released, and then the SMF releases the PDU Session(s) which is to be released using a separate procedure.

NOTE: Step 6 can occur any time after receipt of the N4 Session Modification Response at the SMF.

AMF to NG-RAN: N2 Path Switch Request Ack (N2 SM Information, Failed PDU Sessions)

Once the Nsmf_PDUSession_UpdateSMContext response is received from all the SMFs, the AMF aggregates the received CN Tunnel Info and sends this aggregated information as a part of N2 SM Information along with the Failed PDU Sessions in N2 Path Switch Request Ack to the Target NG-RAN. If none of the requested PDU Sessions have been switched successfully, the AMF sends an N2 Path Switch Request Failure message to the Target NG-RAN.

By sending a Release Resources message to the Source NG-RAN, the Target NG-RAN confirms success of the handover. The Target NG-RAN then triggers the release of resources with the Source NG-RAN.

FIG. 2C illustrates a threat scenario from the existing Xn Handover procedure. The detailed explanation of threat scenario is as follows:
1. The existing Xn handover procedure, defined in NPL 1, is used to handover the UE from a source NG-RAN to target NG-RAN using Xn when the AMF is unchanged and the SMF decides to keep the existing UPF.
2. In pre-existing Xn handover procedure, the source gNB prepares for the Handover as soon as it receives the Measurement report from the UE.
3. According to the measurement report, the source gNB sends Handover request to the target gNB which has the highest signal strength.
4. The problem arises when the Measurement Report is manipulated, this manipulation can happen only when UE is in idle mode and receives the unprotected broadcast messages from the gNB.
5. When UE is in the idle mode, the UE receives the SIBs broadcasted by the gNB present in the cell to which the UE is camped.
6. Since SIBs are sent before the security activation, there is a possibility that a false base station can masquerade the SIB.
7. During the connected state, the handover decision is made based on the Measurement Report which the UE logs when it was in the idle mode.
8. UE will log the measurement report based on the received SIB without knowing that it has been tampered. FIG. 2C depicts the threat scenario from the existing Xn handover procedure.

FIG. 2D illustrates a roaming scenario as defined in NPL 1 in the 5G or LTE system which includes the following major procedures:
1. Attach procedure
2. Authentication procedure
3. Update location procedure
4. Subscriber data retrieval procedure
5. Policy exchange FIG. 2E illustrates PCI reporting in the related art. Self-Configuration of newly deployed gNB is described as follows:
1. FIG. 2E depicts the procedure for Physical cell ID reporting. The gNB will by itself configure the Physical Cell Identity, transmission frequency and power.
2. In centralised assignment of PCI, the OAM system will have a complete knowledge and control of the PCIs.
3. In distributed assignment of PCI, the OAM system assigns a list of possible PCIs to the newly deployed gNB and the adoption of the PCI will be in control of the gNB.
4. The list of the already used PCI is sent in every measurement report sent by the UE to the gNB.

Therefore, the present disclosure provides various methods that can be adapted for preventing a UE from attaching to a false base station in roaming and non-roaming scenarios and also when there are new self-deployed gNBs in the 5G system.

Thus there is a need of security mechanism to protect the UE from getting attached to the false base station.

The principal object of the embodiments according to the present disclosure is to provide a method for preventing a User Equipment (UE) from attaching to false base station in wireless communication network.

Another object of the embodiment according to the present disclosure is to generate a UE specific Anonymity Challenge Parameter to the UE based on sensitive information from the UE, cell information, source base station information and an initial Anonymity Challenge Parameter assigned to a particular base station.

Yet another object of the embodiment according to the present disclosure is to send a measurement command message including the UE specific Anonymity Challenge Parameter to the UE and receive an Anonymity Challenge Parameter acknowledgement as response from the UE.

Yet another object of the embodiment according to the present disclosure is to negotiate the UE specific Anonymity Challenge Parameter with the UE to prevent the UE from attaching to the false base station.

Yet another object of the embodiment according to the present disclosure is to negotiate of Anonymity Challenge Parameter in non-roaming scenario, roaming scenario, and Self-Organized Network (SON).

Yet another object of the embodiment according to the present disclosure is to provide a token passing mechanism including generation of a secure token for SIBs, protection of the secure token, and verification of the secure token.

Solution to Problem

In a first aspect, the present disclosure provides a method performed by a source base station. The method includes:
generating a User Equipment (UE) specific anonymity challenge parameter to the UE based on sensitive information from the UE, cell information, source base station information and an initial anonymity challenge parameter assigned to a particular base station;
sending a measurement command message including the UE specific anonymity challenge parameter to the UE;
receiving an anonymity challenge parameter acknowledgement as a response from the UE;
negotiating the UE specific anonymity challenge parameter with the UE to prevent the UE from attaching to a false base station.

In a second aspect, the present disclosure provides a source base station. The source base station is configured to implement the steps of the above method.

In a third aspect, the present disclosure provides a method performed by a User Equipment (UE). The method includes:
receiving a measurement command message including an anonymity challenge parameter from a source base station;
sending a UE specific anonymity challenge parameter acknowledgement as a response to the source base station;
mapping the UE specific Anonymity challenge parameter with an identifier of a cell on which the UE is camped and information associated with the source base station;
updating an access control list available at the UE based on the mapping to prevent the UE from attaching to a false base station.

In a fourth aspect, the present disclosure provides a user equipment (UE). The UE is configured to implement the steps of the above method.

BRIEF DESCRIPTION OF DRAWINGS

In the present disclosure, a method and a system are illustrated in the accompanying drawings, throughout which like reference letters indicate corresponding parts in the various figures. The embodiments according to the present disclosure will be better understood from the following description with reference to the drawings, in which:

FIG. 2C illustrates a threat scenario from the existing Xn Handover procedure;

DESCRIPTION OF EMBODIMENTS

Figure 1A:
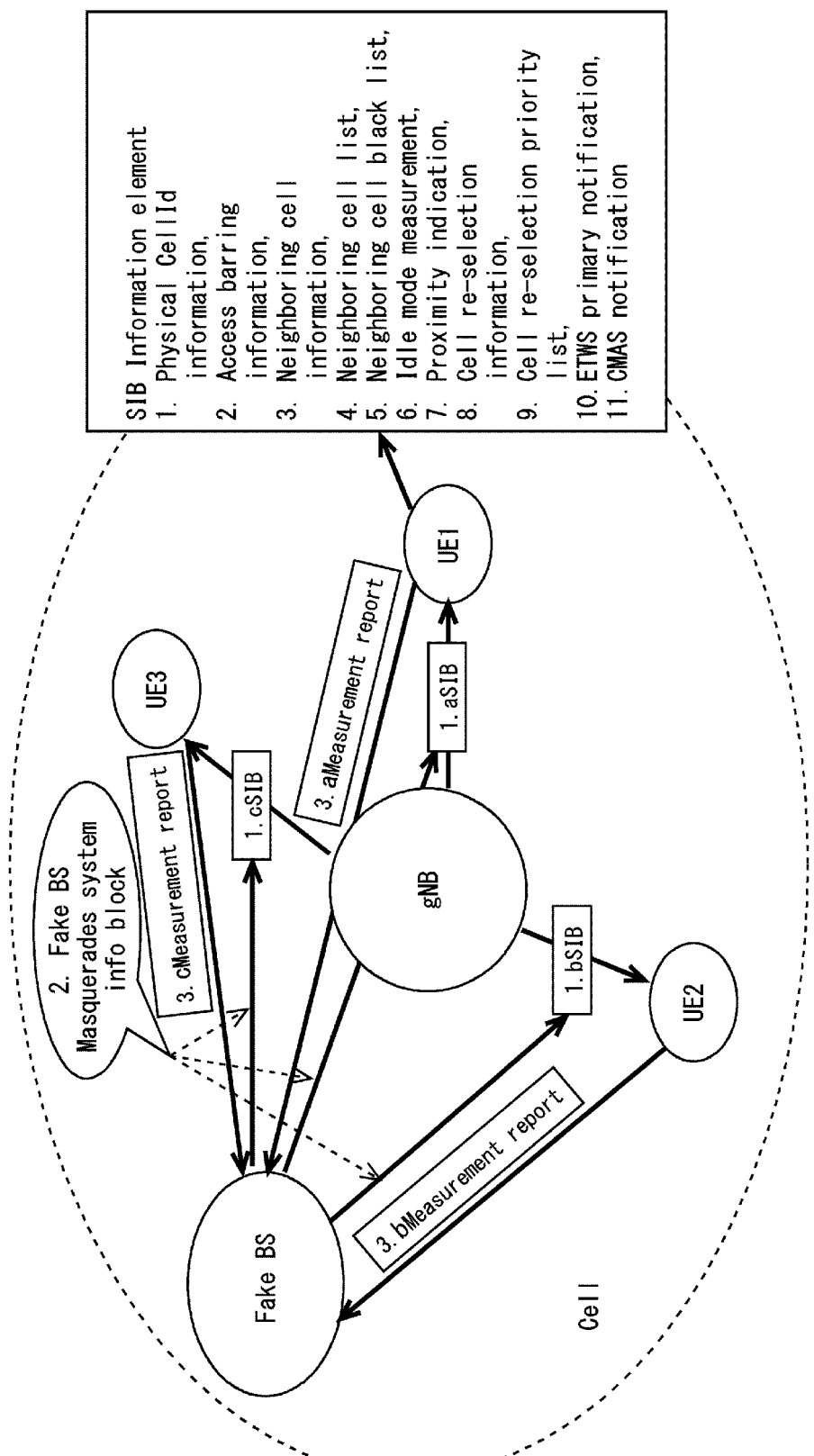
FIG. 1A illustrates a fake base station attack scenario when attacker (fake base station) is present in a same cell, according to the related art.
Figure 1B:
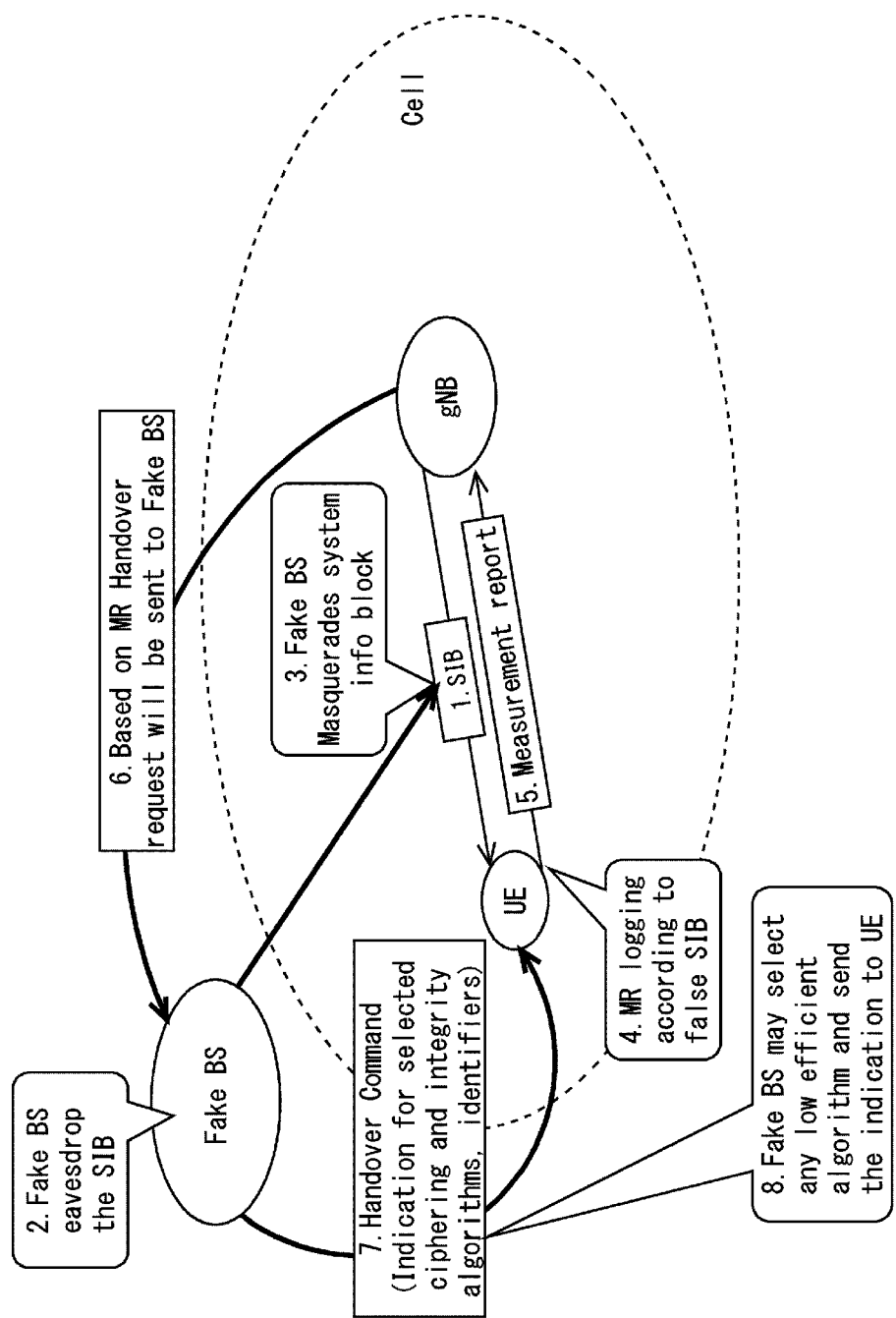
FIG. 1B illustrates a fake base station attack scenario when attacker (fake base station) is present in a different cell, according to the related art.
Figure 2A:
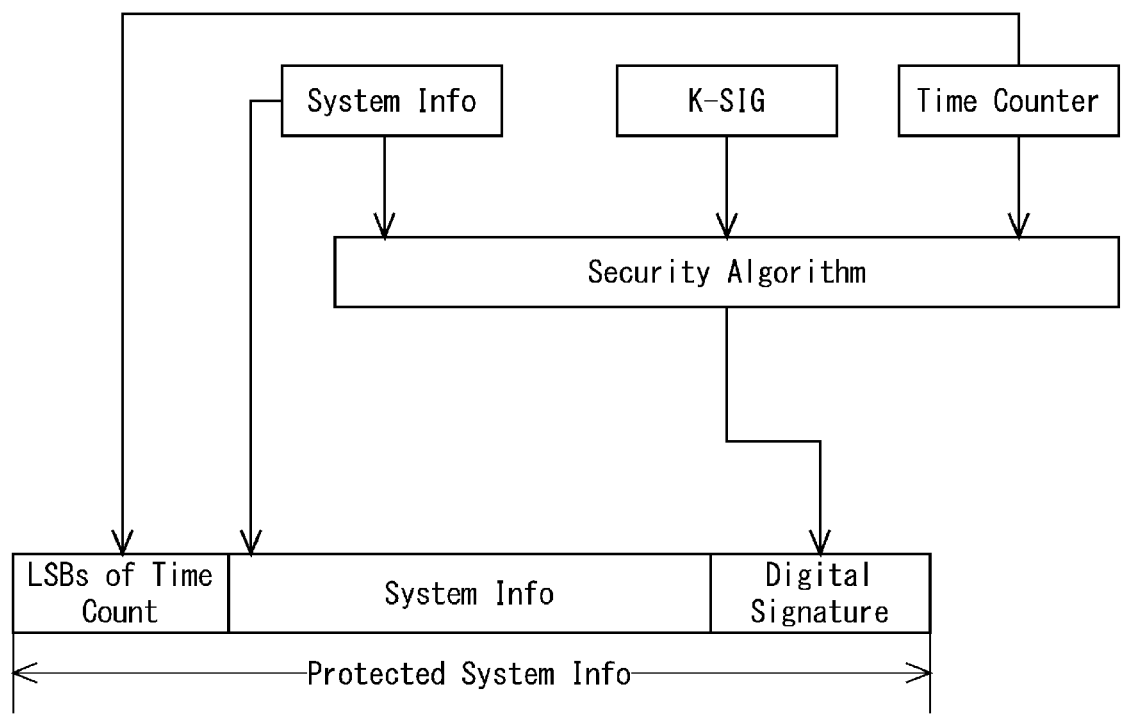
FIG. 2A illustrates system information verification using digital signatures, according to the related arts.
Figure 2B:
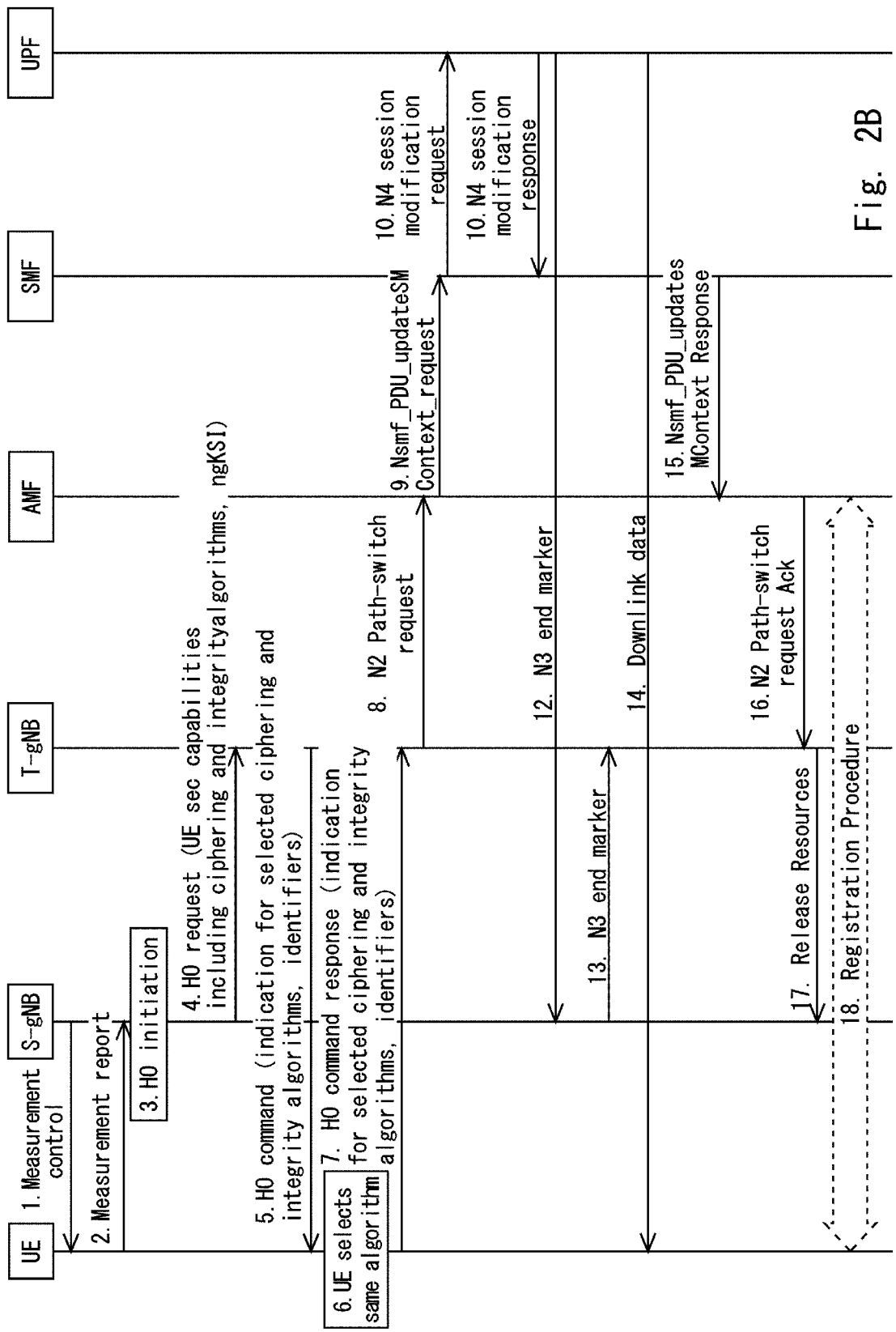
FIG. 2B illustrates Xn based inter NG-RAN handover, according to the related art.
Figure 2D:
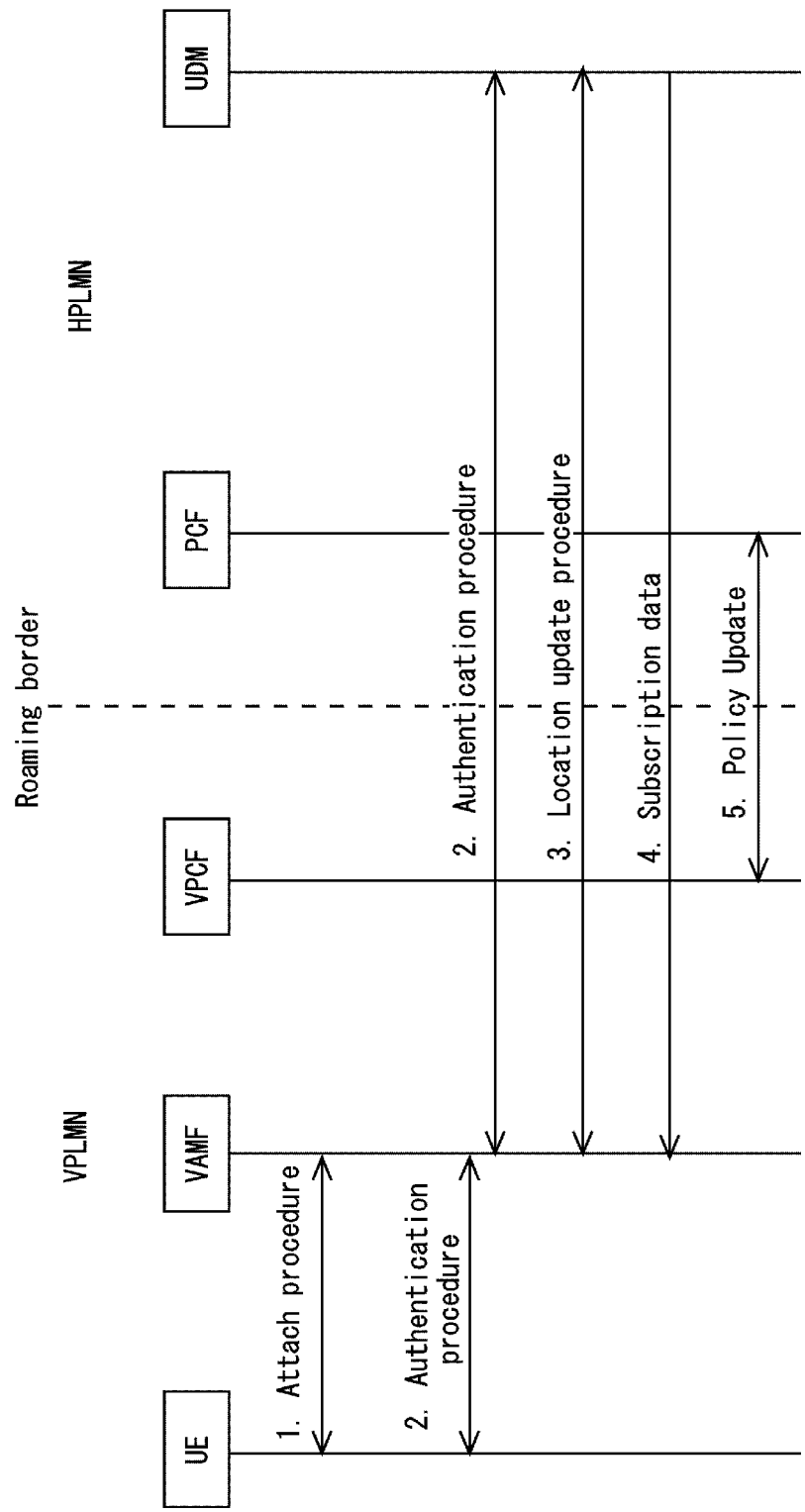
FIG. 2D illustrates a roaming scenario in the 5G or LTE system.
Figure 2E:
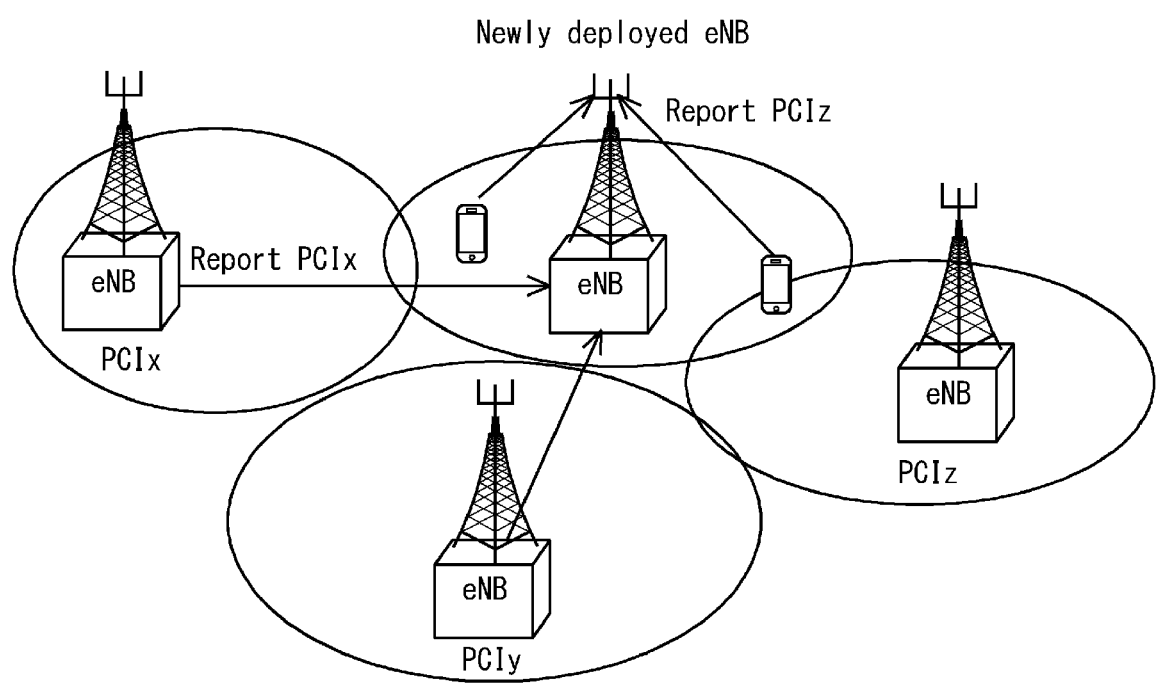
FIG. 2E illustrates PCI reporting in the related art.

Accordingly, embodiments according to the present disclosure disclose a method and a source base station for preventing a User Equipment (UE) from attaching to a false base station. The method includes: generating, by the source base station, a UE specific Anonymity Challenge Parameter to the UE based on sensitive information from the UE, cell information, source base station information and an initial Anonymity Challenge Parameter assigned to a particular base station; and sending, by the source base station, a measurement command message including the UE specific Anonymity Challenge Parameter to the UE. Further, the method includes: receiving, by the source base station, an Anonymity Challenge Parameter acknowledgement as a response from the UE; and negotiating, by the source base station, the UE specific Anonymity Challenge Parameter with the UE to prevent the UE from attaching to a false base station.

In an embodiment, the UE specific Anonymity Challenge Parameter is generated by at least one of a Pseudo Random Number Generator (PRNG) and any options using sensitive SIBs sent by the UE.

In an embodiment, the Anonymity Challenge Parameter is generated by the source base station only when the UE is in a Radio Resource Control (RRC) connected mode and only for a new UE entering a cell associated with the source base station, wherein information of the UE entering and leaving the cell is sent to the source base station in a proximity indication message sent by the UE to the source base station.

In an embodiment, the source base station deletes Anonymity Challenge Parameter assigned to the UEs leaving the cell based on the proximity indication message.

In an embodiment, the negotiating the UE specific Anonymity Challenge Parameter with the UE to prevent the UE from attaching to a false base station includes: determining, by the source base station, to perform a handover procedure from the source base station to a target base station; sending, by the source base station, an Anonymity Challenge negotiation request to the target base station; receiving, by the source base station, an Anonymity Challenge negotiation response including a target base station specific Anonymity Challenge Parameter from the target base station; negotiating, by the source base station, by determining a correlation of Anonymity Challenge Parameter associated with an identifier of the cell and target base station related information in a Access Control List of the source base station; sending, by the source base station, a Handover request to the target base station with a security context in response to determining that the negotiation is successful based on the correlation. Further, in response to determining that the negotiation is unsuccessful based on the correlation sending, by the source base station, a target base station failure cause message considering the target base station as a fake base station.

In an embodiment, when the negotiation is unsuccessful, the source base station performs at least one of adding the target base station to a black list, initiating a Timer for re-trying to attach the UE to the target base station till the timer is expired and, after expiry of the timer the source base station, adding the target base station to a black list after expiry of the time or removing the target base station from the black list if the target base station is proven to be genuine, and requesting the UE to log a new Measurement Report.

In an embodiment, the source base station has information about the Anonymity Challenge Parameter of all the neighboring base stations and the Anonymity Challenge Parameter assigned to UEs by neighboring base stations.

In an embodiment, the target base station related information in the Access Control List UE specific including the Anonymity Challenge Parameter associated with a cell identifier of the target base station.

In an embodiment, the when the source base station receives the Anonymity Challenge Parameter in the Anonymity challenge negotiation response, the source base station checks for the correlation between the Anonymity Challenge Parameter sent by the target base station and the Anonymity Challenge Parameter associated with at least one of a target cell identifier, a target public land mobile network (PLMN) identifier, a Tracking Area Code (TAC), a neighboring cell list, UE history information, and a mobility information present in the Access control list of the source base station.

In an embodiment, when the source base station receives the Anonymity Challenge Parameter in the Anonymity challenge negotiation response, the source base station checks for the UE specific Anonymity Challenge Parameter and UE history information including at least one of a last visited cell, a cell identifier, a cell type, a time UE stayed in the cell, and a handover cause.

Another aspect of the present disclosure provides a UE and method thereof for preventing a User Equipment (UE) from attaching to a false base station. The method includes: receiving, by the UE, a measurement command message including an Anonymity Challenge Parameter from the source base station; and sending, by the UE, a UE specific Anonymity Challenge Parameter acknowledgement as a response to the source base station. Further, the method includes: mapping, by the UE, the UE specific Anonymity Challenge Parameter with an identifier of a cell on which the UE is camped and information associated with the source base station; and updating, by the UE, an Access Control List available at the UE based on the mapping to prevent the UE from attaching to a false base station.

In an embodiment, the UE erases the Anonymity Challenge Parameter stored in a database when the UE enters into a power-off mode.

Unlike the systems and methods in the related art, the proposed method will prevent a UE from being served by a false base station and will verify the base station's legitimacy and may also provide a mechanism to isolate the fake base station using Anonymity Challenge Parameter in the 5G system. The proposed solutions ensure that the system information block has not been tampered by any attacker and attacks such as DoS attack on the UE and the network, subscriber's privacy attack, rogue services may be prevented.

These and other aspects of the embodiments according to the present disclosure will be better appreciated and understood when considered in conjunction with the following description and the accompanying drawings. It should be understood, however, that the following descriptions, while indicating preferred embodiments and numerous specific details thereof, are given by way of illustration and not of limitation. Many changes and modifications may be made within the scope of the embodiments according to the present disclosure without departing from the spirit thereof, and the embodiments according to the present disclosure include all such modifications.

The embodiments according to the present disclosure and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments according to the present disclosure.

For purposes of the present disclosure, the terms and definitions given in NPL 4 and the following apply. A term defined in the present document takes precedence over the definition of the same term, if any, in NPL 4.

The accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

Anonymity Challenge Parameter Negotiation

Figure 3:
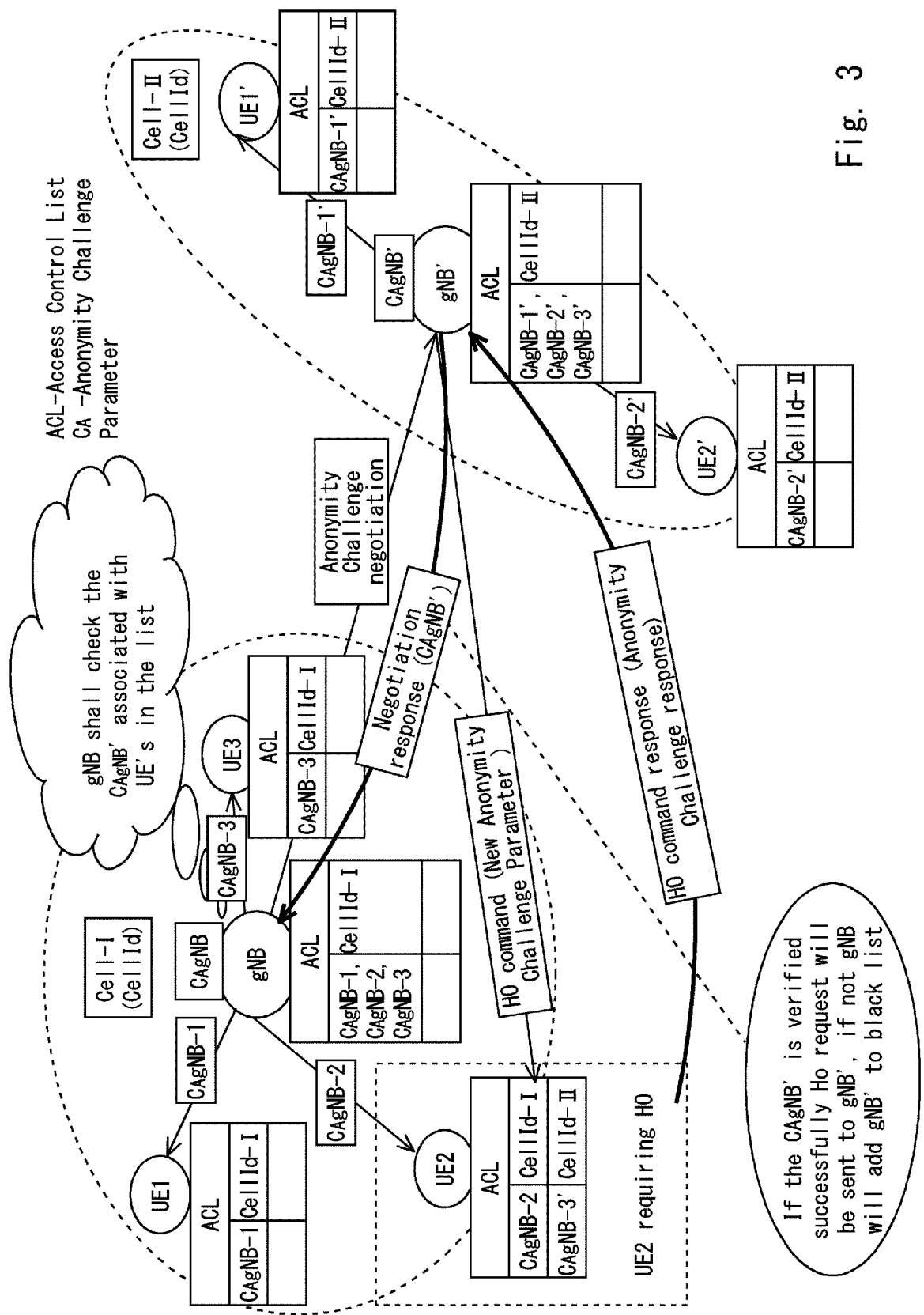
FIG. 3 illustrates Anonymity Challenge Negotiation between a source gNB and a target gNB, according to an embodiment of the present disclosure.

FIG. 3 illustrates Anonymity Challenge Negotiation between a source gNB and a target gNB (gNB also referred as a base station), according to an embodiment of the present disclosure. In an embodiment, it is assumed that the UE1, UE2 and UE3 are camped on the Cell-I and are served by a particular gNB. Similarly, it is assumed that the UE1' and UE2' are camped on the Cell-II and are served by the gNB'.

Generally, during an idle state, UEs in a cell will be receiving the System Information Block broadcasted by the gNB (genuine base station). In the idle mode, the UE will not be able to validate the received system information, considering a false base station which may counterfeit the system information broadcasted by the genuine gNB. The UE in the idle mode may assume that the system information received by the UE is from genuine gNB and send the Measurement Report accordingly. Based on the Measurement Report, the handover decision will be initiated by the source gNB. Assuming that a UE is in RRC_Connected state, when there is a degradation in signal strength (due to UE mobility) provided by serving base station, there will be a need of handover from a source gNB to a target gNB.

While the UE is in RRC_Connected mode, the gNB will generate and send a unique challenge value called the UE specific Anonymity Challenge Parameter ($C_A$) to the UE1, UE2 and UE3 based on the response sent by UEs for Anonymity Challenge request in Measurement command message. Unlike systems and methods in the related art, the $C_A$ is a unique value assigned initially to every gNB. This parameter $C_A$ is also assigned to every UE present in a particular cell. The UE specific Anonymity Challenge Parameter is generated by the gNB by using sensitive information from the UE, cell information, gNB information and the initial $C_A$ parameter assigned to the particular gNB.

Similarly, gNB' will assign the $C_A$ to the UE1' and UE2'. These $C_A$'s will be unique for each UE connected to the gNB or gNB'. On receiving the $C_A$'s sent by the gNB, the UEs will map those $C_A$'s with the corresponding Cell-Id and other gNB related information and update the Access Control List present with the UE. When handover is required for the UE2, the gNB (source gNB) will send anonymity challenge negotiation request to the gNB' (target gNB). The target gNB' will send anonymity negotiation response along with the $C_A$ (gNB specific $C_A$). The source gNB checks for the correlation of the $C_A$ associated with the Cell ID and other target gNB related information in the Access Control List. If negotiation is successful, the source gNB will send Handover request to the target gNB' and the Handover procedure proceeds as defined in NPL 1. If negotiation fails:
  i. The source gNB sends the failure cause message to the target gNB' and the gNB will add gNB' to the black list or;
  ii. The timer can be maintained for re-trying to get attached to the same gNB till the timer expires. After the timer is expired, the gNB can add the fake gNB Id to the black list or;
  iii. The service provider may remove the gNB from the black list if gNB is proven to be genuine or;
  iv. The source gNB requests the UE to log new Measurement Report, see FIG. 3 for Anonymity Challenge Negotiation between the source gNB and the target gNB.

Freshness of $C_A$

A UE camped on a cell deletes the $C_A$ assigned by the gNB when it leaves the cell, this can be verified by the gNB when the UE sends the Proximity indication before leaving the cell. It is to be noted that the new Information Element for the $C_A$ parameter can be introduced in the proximity indication message sent by the UE. The new $C_A$ parameter is assigned to the UE connecting to the new gNB in a different cell. When the UE goes to power off mode, the UE erases all the $C_A$ parameters stored in the database. When the UE gets switched on again, the gNB sends a fresh $C_A$ parameter to the UE.

Anonymity Challenge Parameter Generator

Figure 4:
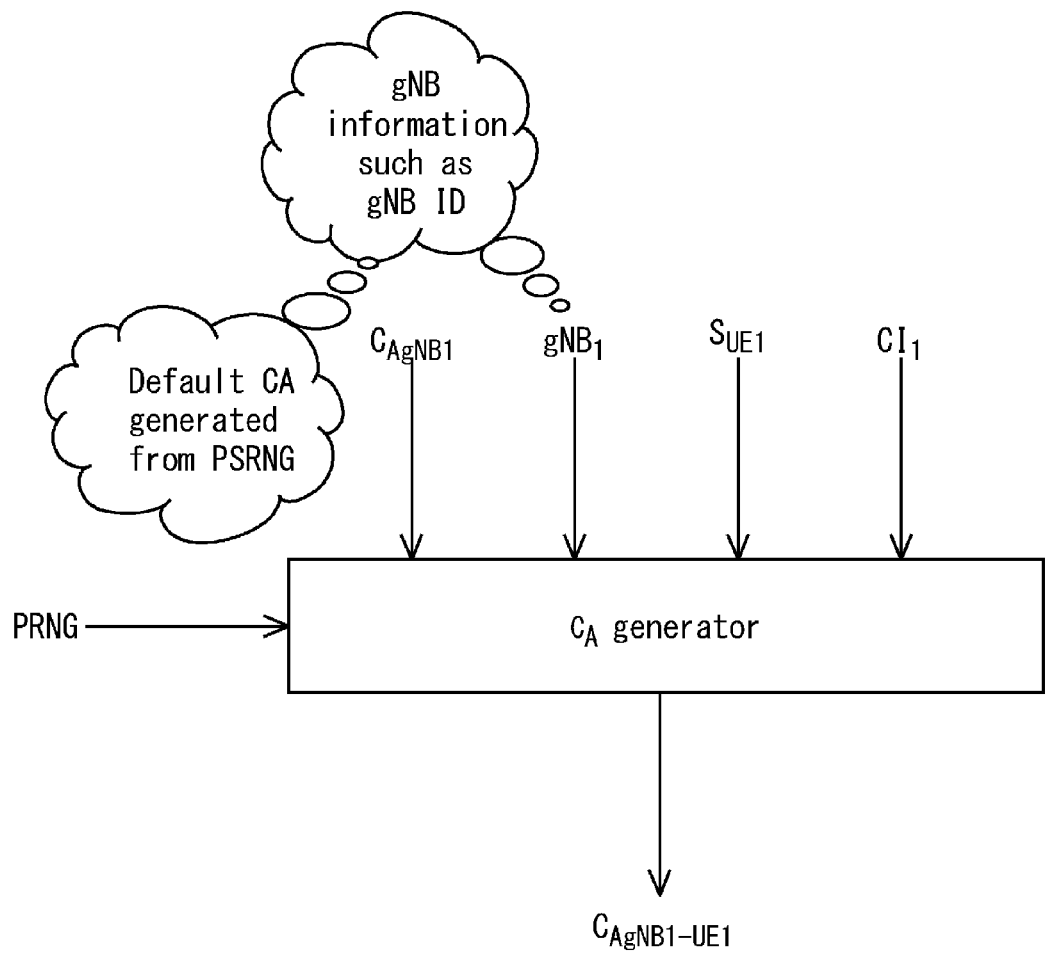
FIG. 4 illustrates an example scenario of generation of Anonymity Challenge Parameter, according to an embodiment of the present disclosure.

FIG. 4 illustrates an example scenario of generation of an Anonymity Challenge Parameter, according to an embodiment of the present disclosure. In an embodiment, the $C_A$ unique for all the gNBs is generated by the gNB based on the UEs in the vicinity. The UE specific Anonymity Challenge Parameter is performed by the gNB by using sensitive information from the UE ($S_{UE}$), cell information (CI), gNB information ($gNB_{info}$) and the initial $C_A$ parameter assigned to a particular gNB ($C_{AgNB}$). A newly deployed gNB in a cell will have a default Anonymity Challenge Parameter ($C_A$). The Anonymity Challenge Parameter ($C_A$) is generated by a Pseudo Random Number Generator (PRNG) or any options using sensitive SIBs which are sent by the UEs. The Anonymity Challenge Parameter ($C_A$) is generated by the gNB only when the UEs are in the RRC connected state.

The $C_A$ parameter may be used in the 5G system in order to provide and support privacy issues for the gNBs and the UEs during handover, and, before handover procedure is initiated, the $C_A$ parameter may be negotiated between the gNBs and the UEs in order to prevent the UE from attaching to a false base station. Based on the above mentioned scenarios three use cases has to be taken into account:
  i. Non-Roaming scenario
  ii. Roaming scenario
  iii Self-Organized Network (SON)

In an embodiment, the procedure for generating Anonymity Challenge Parameter ($C_A$) has two options. In a first option, when a new UE enters the cell, based on the UE's availability, the gNB will generate new Anonymity Challenge Parameter ($C_A$) only for the new UE entering the cell. Information of the UE entering/leaving the cell is sent to the gNB in the proximity indication message sent by the UE to the gNB. Based on the proximity indication, the gNB can delete the $C_A$ assigned to the UE leaving the cell. In a second option, the Anonymity Challenge Parameter ($C_A$) is generated based on the optional-request made based on the service provider. In this case, a newly deployed gNB in a cell will have a default $C_A$ parameter. When a new UE enters the cell, based on the UE's availability, the gNB will generate new $C_A$ parameters for all the UEs in the vicinity. These $C_A$'S will be distributed to all the UEs present inside the cell. When there is a need of handover, the Anonymity Challenge Parameter will be negotiated between the source gNB and the target gNB.

Considering a scenario where there are N number of cells and N number of UEs and CI is cell information, $UE_M$ is the number of UEs in the cell, the $gNB_N$ is the base station present in a cell, as shown in the FIG. 4.

Let $CI=CI_1, CI_2, CI_3, CI_4 \ldots CI_N$ where N is the Cell Number, $UE=UE_1, UE_2, UE_3, UE_4, \ldots, UE_N$ where N is the UE number, $gNB_{info}=gNB_1, gNB_2, gNB_3 \ldots, gNB_N$ where N is the gNB number, $C_{AgNB}=C_{AgNB1}, C_{AgNB2}, C_{AgNB3}, C_{AgNB4} \ldots, C_{AgNBN}$ where N is the $C_A$ number. The $gNB_{info}$ is gNB information such as gNB ID, cell ID, cell carrier frequency, etc. The $gNB_{info}$ is used to generate the $C_A$.

Let $S_{UE}$ be the sensitive information of a UE which will be one of the input for the $C_A$ generator such that $S_{UE}=S_{UE1}, S_{UE2}, S_{UE3} \ldots S_{UEN}$ where N is the UE number.

This sensitive information is such as last visited cell information, last visited PLMN, which includes the cell ID, cell type, time UE stayed in the cell, Handover cause etc.

The CI is cell information such as Cell Id, Cell type, carrier frequency, etc.

The $C_{AgNB}$ is the default Anonymity challenge parameter assigned to every gNB in the 5G system.

Let PRNG be the pseudo random number generator, and $R_1, R_2, R_3 \ldots R_N$ be the output of the PRNG.

Output of the $C_A$ generator is as follows:

$$C_{AgNB1\_UE1}=\{R_1, C_{AgNB1}, gNB_1, S_{UE1}, CI_1\}$$

Figure 5:
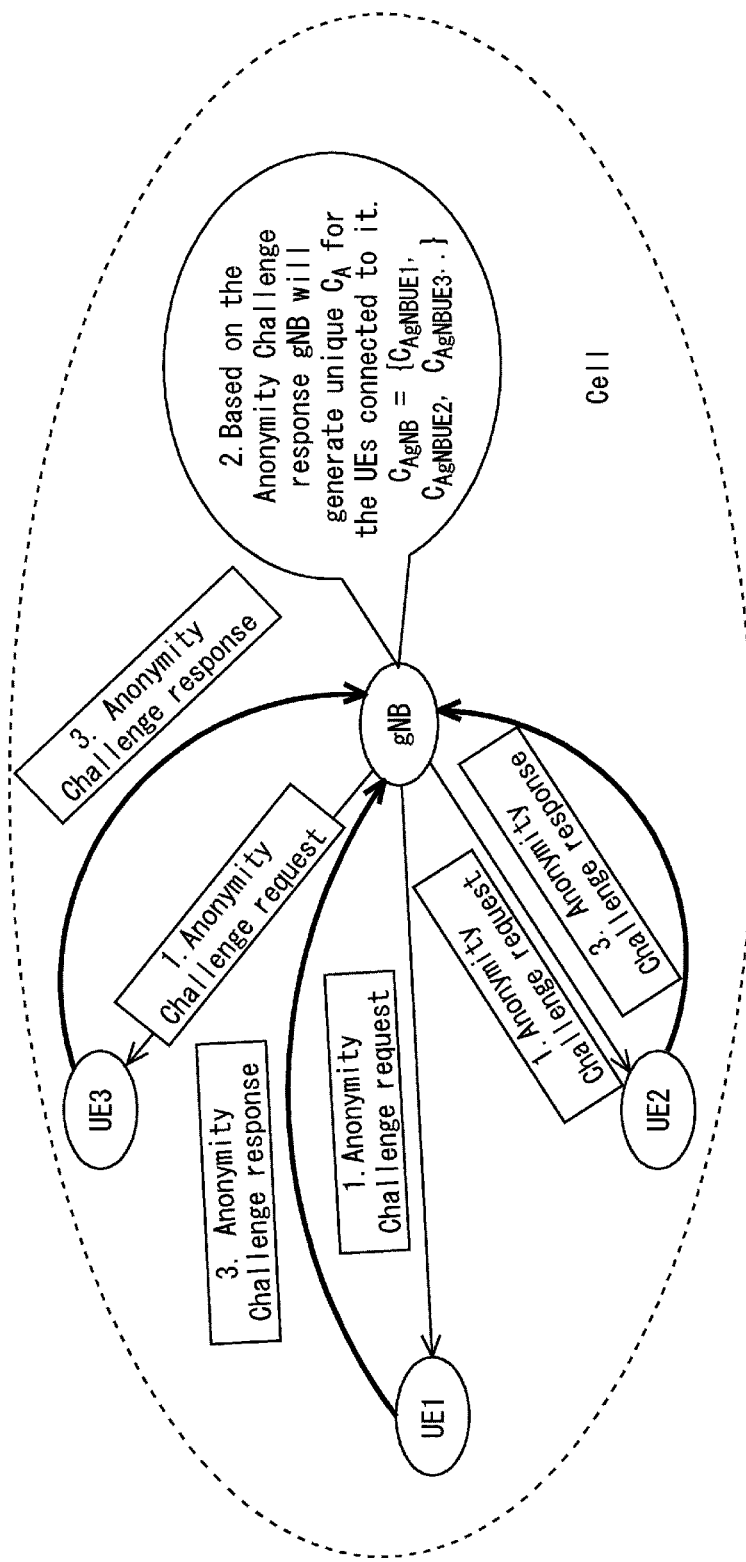
FIG. 5 illustrates a procedure for generation of $C_A$, according to an embodiment of the present disclosure.

FIG. 5 illustrates a procedure for generation of $C_A$, according to an embodiment of the present disclosure. In an embodiment, the gNB sends the Anonymity Challenge Request to the UEs which are currently being served by the gNB. The UE sends Anonymity Challenge response (SIB based information) to the gNB which may include the sensitive system information block. Based on the received response, the gNB generates unique Anonymity Challenge Parameter for each UE connected to it.

Figure 6:
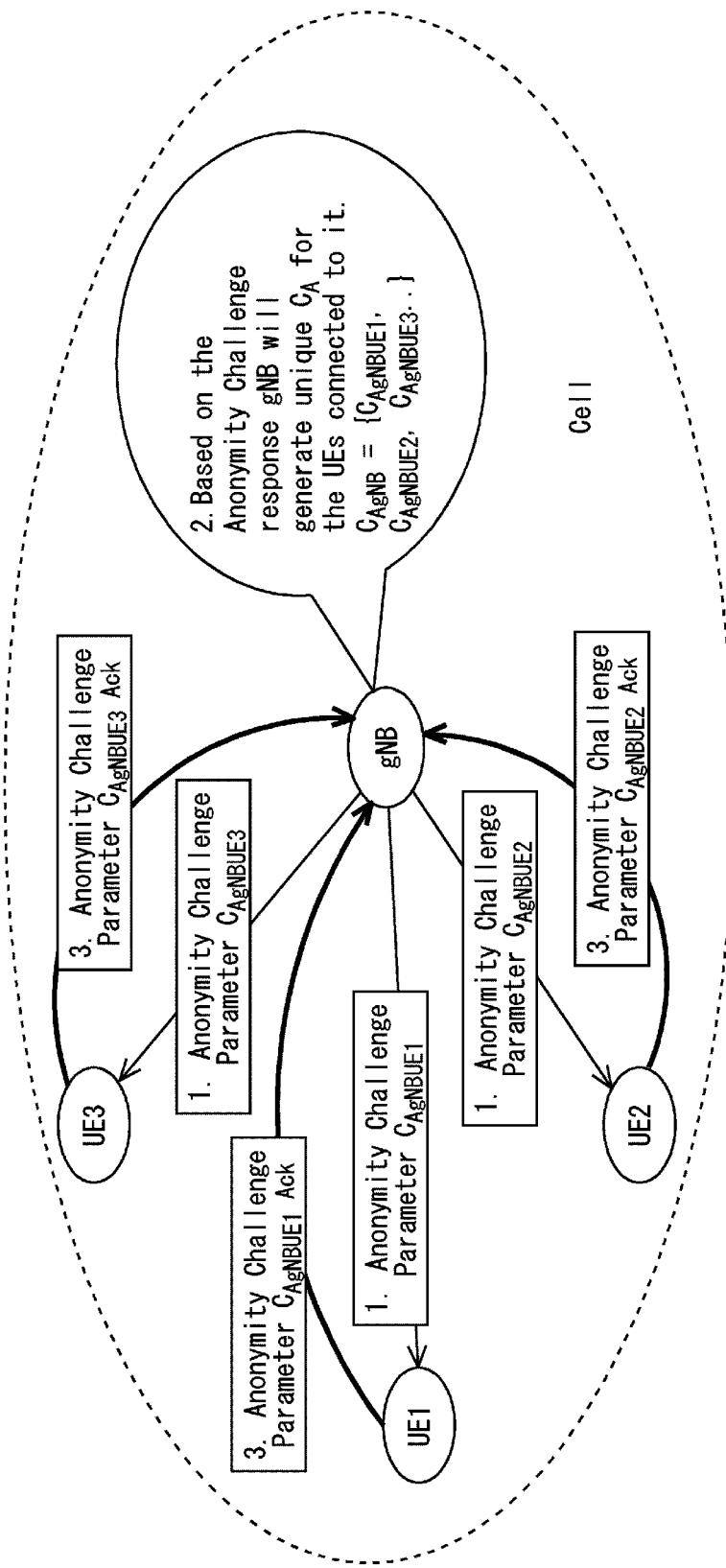
FIG. 6 illustrates a procedure for distribution of $C_A$ by the gNB based on the UEs in the vicinity, according to an embodiment of the present disclosure.

FIG. 6 illustrates a procedure for distribution of the $C_A$ by the gNB based on the UEs in the vicinity, according to an embodiment of the present disclosure. In an embodiment, the after the generation of $C_A$'s, the gNB distributes the $C_A$'s generated for each UE. The $C_A$ for each UE is sent to the UE in the measurement command message sent by the gNB to the UE. On receiving the assigned $C_A$, the UE sends the Anonymity Challenge Parameter acknowledgement as a response.

Preventing UE from being Attached to False Base Station in Non-Roaming Scenario

Figure 7:
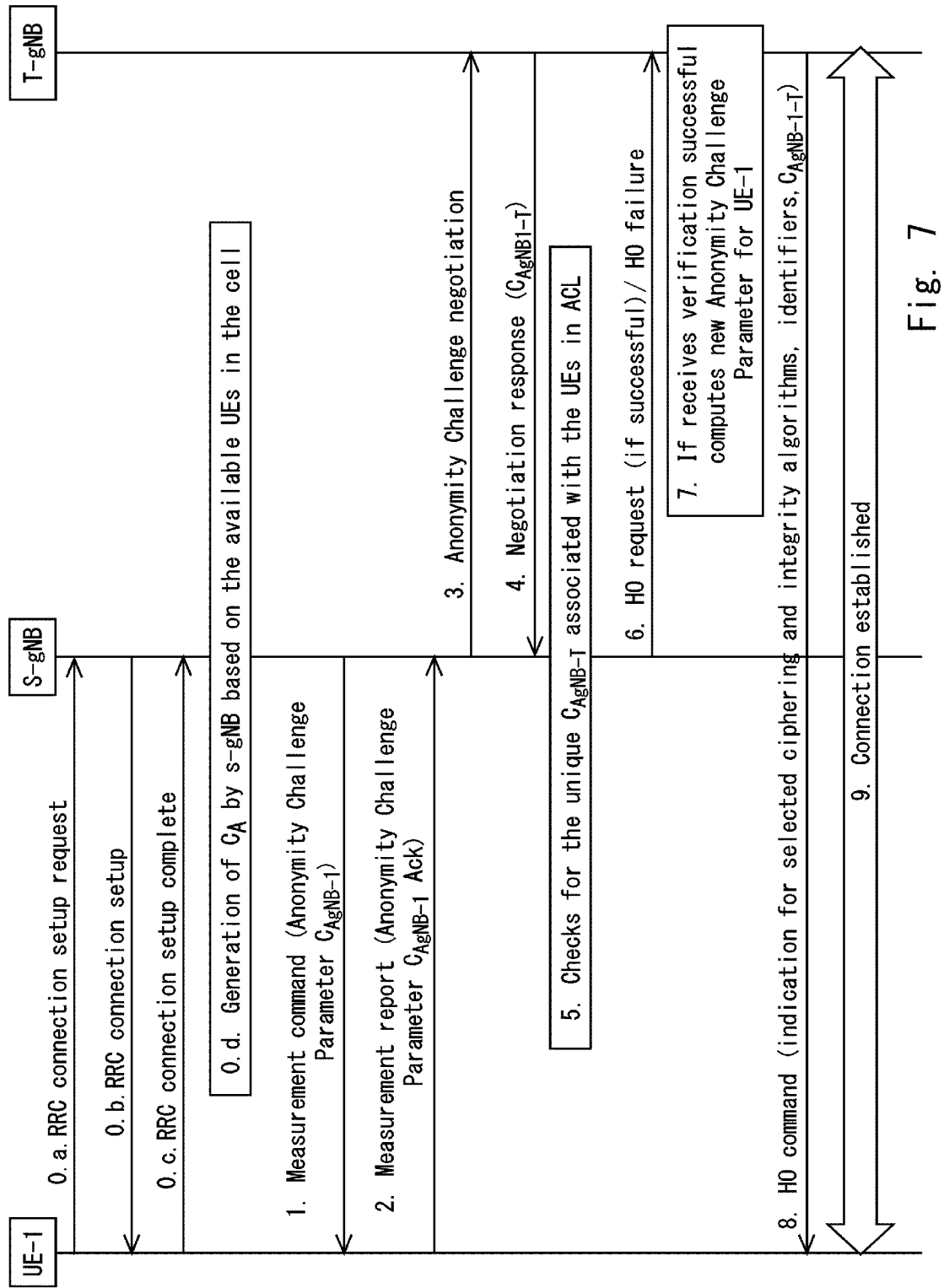
FIG. 7 illustrates a procedure for negotiation of an Anonymity Challenge Parameter in a non-roaming scenario, according to an embodiment of the present disclosure.

FIG. 7 illustrates a procedure for negotiation of the Anonymity Challenge Parameter in a non-roaming scenario, according to an embodiment of the present disclosure. In an embodiment, the procedure is described as follows:

0. a. The UE sends the RRC connection setup request to the gNB. FIG. 7 depicts the call flow for negotiation of the Anonymity Challenge Parameter in a non-roaming scenario.
0. b. The gNB sends the RRC connection setup message to the UE.
0. c. The UE sends the RRC connection setup complete message as an acknowledgement.
0. d The gNB generates the Anonymity Challenge Parameter ($C_A$) for all the UEs present in the cell.
1. The gNB sends the UE specific Anonymity Challenge Parameter ($C_A$) to the UE in the Measurement command message.
2. The UE acknowledges the Anonymity Challenge Parameter ($C_A$) by sending the acknowledgement message in the response.
3. When there is a need for handover, the source gNB initiates Anonymity Challenge negotiation with the target gNB.
4. The target gNB sends the $C_A$ parameter along with the Anonymity Challenge Negotiation response.
5. The source gNB checks for the correlation of the $C_A$ associated with the Cell ID in the Access Control List.
6. If negotiation is successful, the source gNB sends Handover request to the target gNB and the Handover procedure proceeds as defined in NPL 1.
7. If negotiation fails:
   a. The source gNB sends the target gNB the failure cause message and the source gNB adds the target gNB to the black list or;
   b. The timer can be maintained for re-trying to get attached to the same target gNB till the timer expires. After the timer is expired the source gNB can add the fake gNB Id to the black list or;
   c. The service provider may remove the gNB from the black list if the gNB is proven to be genuine or;
   d. The source gNB requests the UE to log new Measurement Report.
8. After successful negotiation, the target gNB sends the Handover command message to the UE.
9. The procedure for the Xn handover between the source gNB and the target gNB as defined in NPL 1 is followed.

Figure 8:
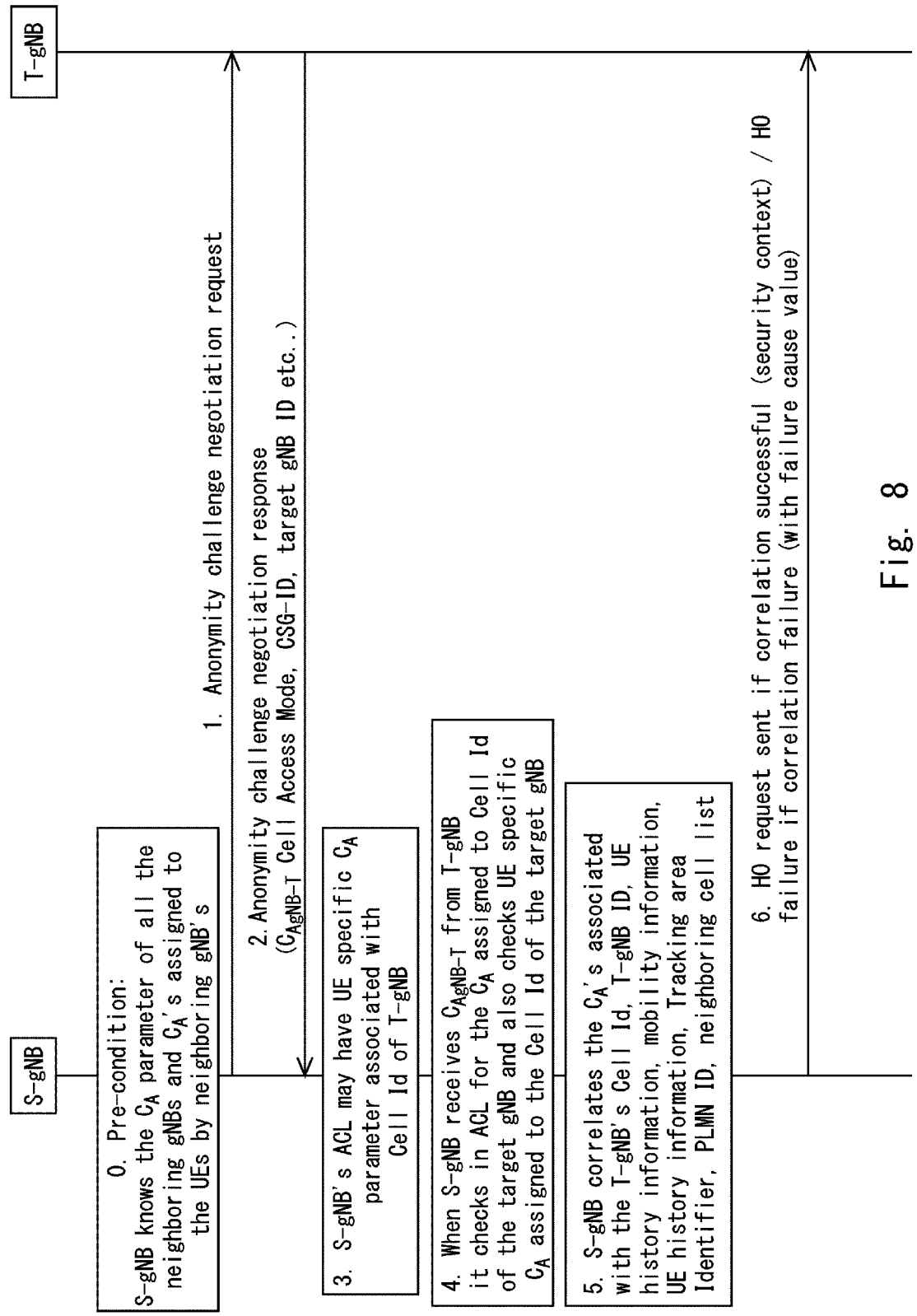
FIG. 8 illustrates a procedure for Anonymity Challenge Negotiation between a source gNB and a target gNB, according to an embodiment of the present disclosure.

FIG. 8 illustrates a procedure for Anonymity Challenge Negotiation between the source gNB and the target gNB, according to an embodiment of the present disclosure. In an embodiment, steps involved are as follows (see FIG. 8 for detailed procedure for the Anonymity Challenge Negotiation between the source gNB and the target gNB):

0. Pre-condition—The source gNB knows the $C_A$ parameter of all the neighboring gNBs and $C_A$'s assigned to the UEs by the neighboring gNBs.
1. When there is a need of handover, the source gNB sends the Anonymity challenge negotiation request to the target gNB.
2. The target gNB sends the Anonymity challenge negotiation response along with the $C_A$ parameter of the target gNB, the target gNB ID, CSG-ID, etc.
3. The source gNB's Access Control List may have the UE specific $C_A$ parameter associated with Cell Id of the target gNB.
4. When the source gNB receives the $C_A$ from the target gNB, the source gNB checks in the Access Control List for the $C_A$ assigned to the Cell ID of the target gNB and also checks the UE specific $C_A$ assigned to the Cell ID of the target gNB.
5. The source gNB correlates the $C_A$'S associated with the target gNB's cell ID, target gNB ID, UE history information, mobility information, Tracking Area Identifier, PLMN ID, neighboring cell list, etc.
6. If the correlation is successful, the source gNB sends the Handover request to the target gNB along with the security context. If the correlation fails, the source gNB sends the handover failure message to the target gNB along with the failure cause.

Figure 9:
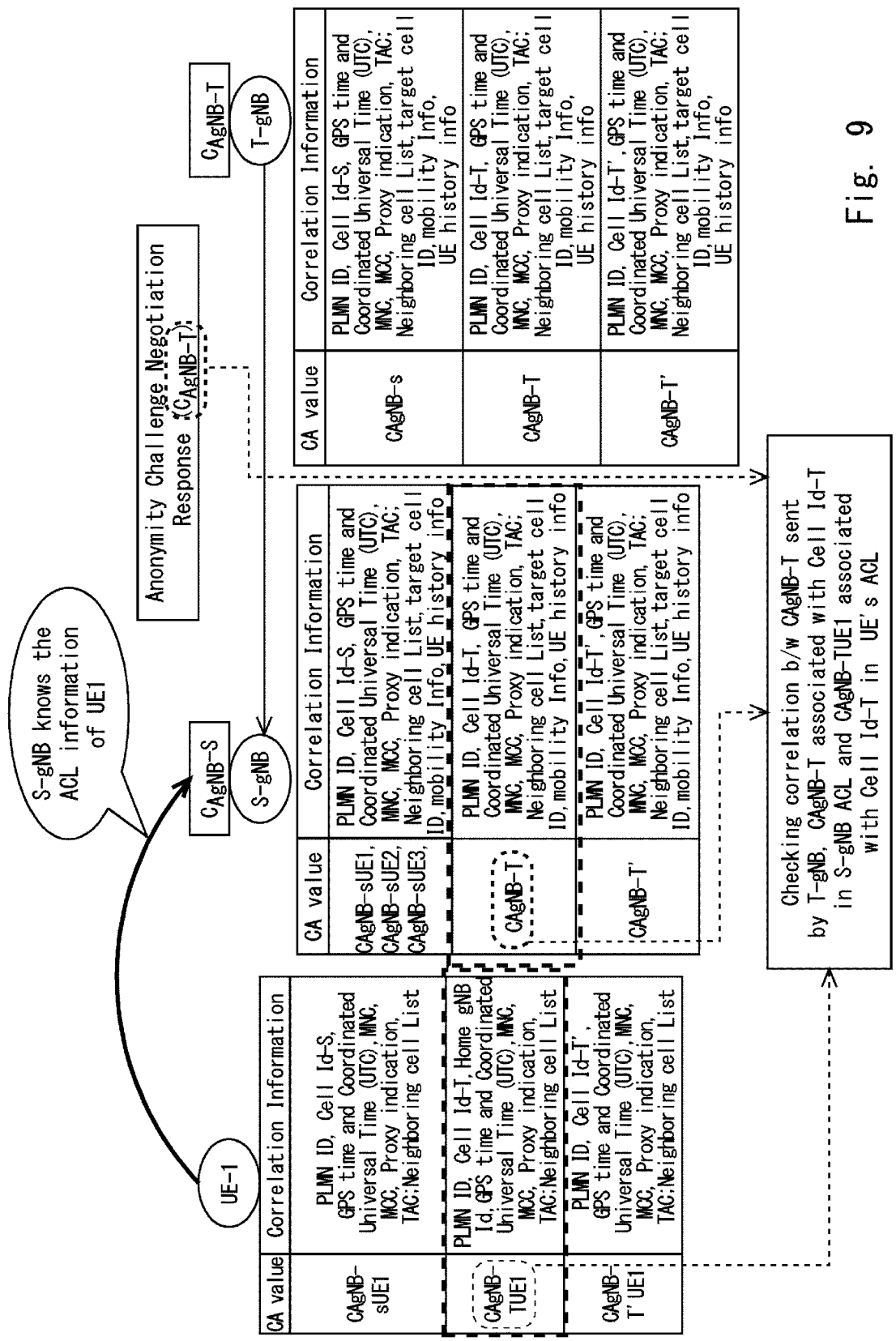
FIG. 9 illustrates a procedure for checking for correlation of the $C_A$'s at the source gNB, according to an embodiment of the present disclosure.

FIG. 9 illustrates a procedure for checking for correlation of the $C_A$'S at the source gNB, according to an embodiment of the present disclosure. In an embodiment, when the source gNB receives the $C_A$ parameter in the Anonymity challenge negotiation response, the source gNB checks for the correlation between the $C_A$ sent by target gNB and the $C_A$ associated with the target cell ID, target PLMN ID, TAC, neighboring cell list, UE history information, mobility information etc. present in the Access control list of the source gNB. If the correlation is successful, the handover request is sent by the source gNB to the target gNB with the security context, ciphering and integrity technique used etc. as shown in the FIG. 9.

Figure 10:
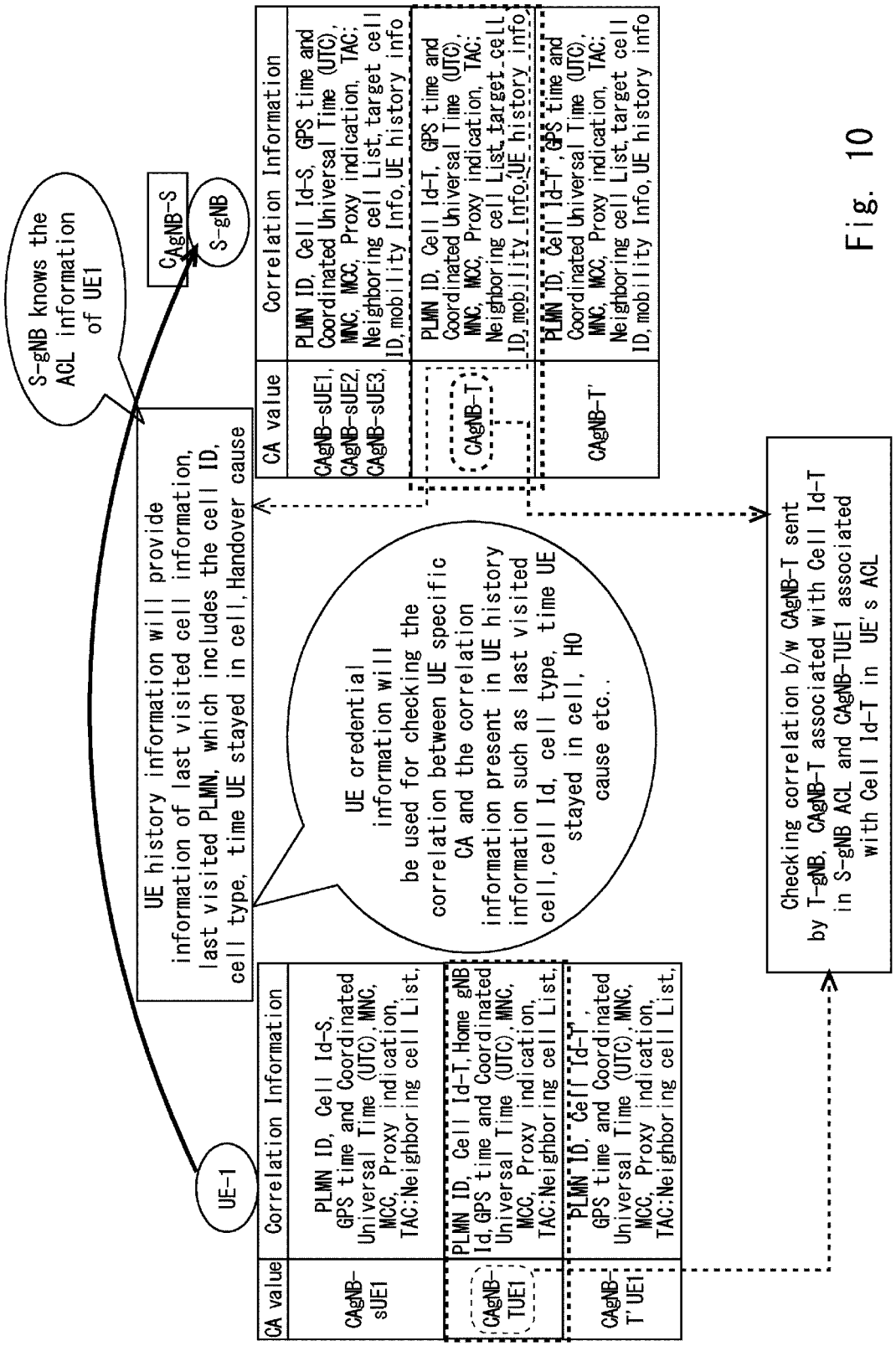
FIG. 10 illustrates a procedure for checking for correlation of UE specific $C_A$'s, according to an embodiment of the present disclosure.

FIG. 10 illustrates a procedure for checking for correlation of the UE specific $C_A$'s, according to an embodiment of the present disclosure. In an embodiment, when the source gNB receives the $C_A$ parameter in an Anonymity challenge negotiation response, the source gNB checks for the correlation between the $C_A$ sent by target gNB and the $C_A$ associated with the target cell ID, target PLMN ID, TAC, neighboring cell list, UE history information, mobility information etc. present in the UE's Access control list. The source gNB also checks for the correlation between the UE specific $C_A$ and UE history information such as the last visited cell, cell Id, cell type, time UE stayed in cell, handover cause etc. as shown in the FIG. 10.

Call Flow for Preventing UE from Attached to False Base Station (Non-Roaming)

Figure 11:
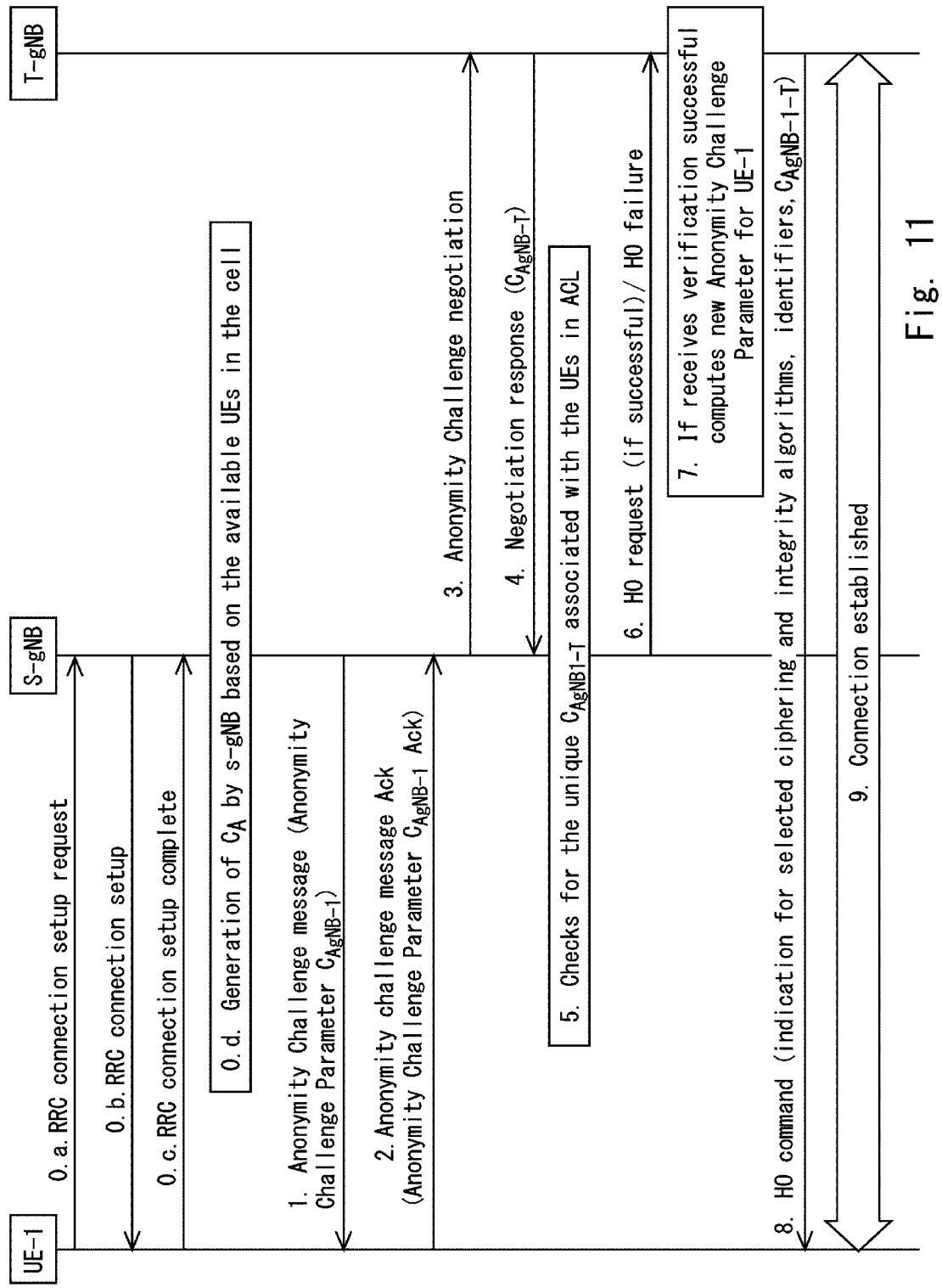
FIG. 11 illustrates a procedure for negotiation of an Anonymity Challenge Parameter in a non-roaming scenario, according to an embodiment of the present disclosure.

FIG. 11 illustrates a procedure for negotiation of the Anonymity Challenge Parameter in a non-roaming scenario, according to an embodiment of the present disclosure. In an embodiment, the procedure is as follows:

0. a. The UE sends the RRC connection setup request to the gNB. FIG. 11 depicts the call flow for negotiation of the Anonymity Challenge Parameter in a non-roaming scenario.
0. b. The gNB sends the RRC connection setup message to the UE.
0. c. The UE sends the RRC connection setup complete message as an acknowledgement.
0. d The gNB generates the Anonymity Challenge Parameter ($C_A$) for all the UEs present in the cell.
1. The gNB sends the UE specific Anonymity Challenge Parameter ($C_A$) to the UE in the Anonymity challenge message.
2. The UE acknowledges the Anonymity Challenge Parameter ($C_A$) by sending the acknowledgement message in the response.
3. When there is a need for handover, the source gNB initiates the Anonymity Challenge negotiation with the target gNB.
4. The target gNB sends the $C_A$ parameter along with the Anonymity Challenge Negotiation response.
5. The source gNB checks for the correlation of the $C_A$ associated with the Cell ID in the Access Control List.
6. If negotiation is successful, the source gNB sends the Handover request to the target gNB and the Handover procedure proceeds as defined in NPL 1.

7. If negotiation fails:
   a. The source gNB sends the target gNB the failure cause message and the source gNB adds the target gNB to the black list or;
   b. The timer can be maintained for re-trying to get attached to the same target gNB till the timer expires. After the timer is expired the source gNB can add the fake gNB Id to the black list or;
   c. The service provider may remove the gNB from the black list if the gNB is proven to be genuine or;
   d. The source gNB requests UE to log new Measurement Report.
8. After successful negotiation, the target gNB sends the Handover command message to the UE.
9. The procedure for Xn handover between the source gNB and the target gNB as defined in NPL 1 is followed.

Generation of $C_A$ by s-gNB Based on the Available UEs in the Cell

Figure 12:
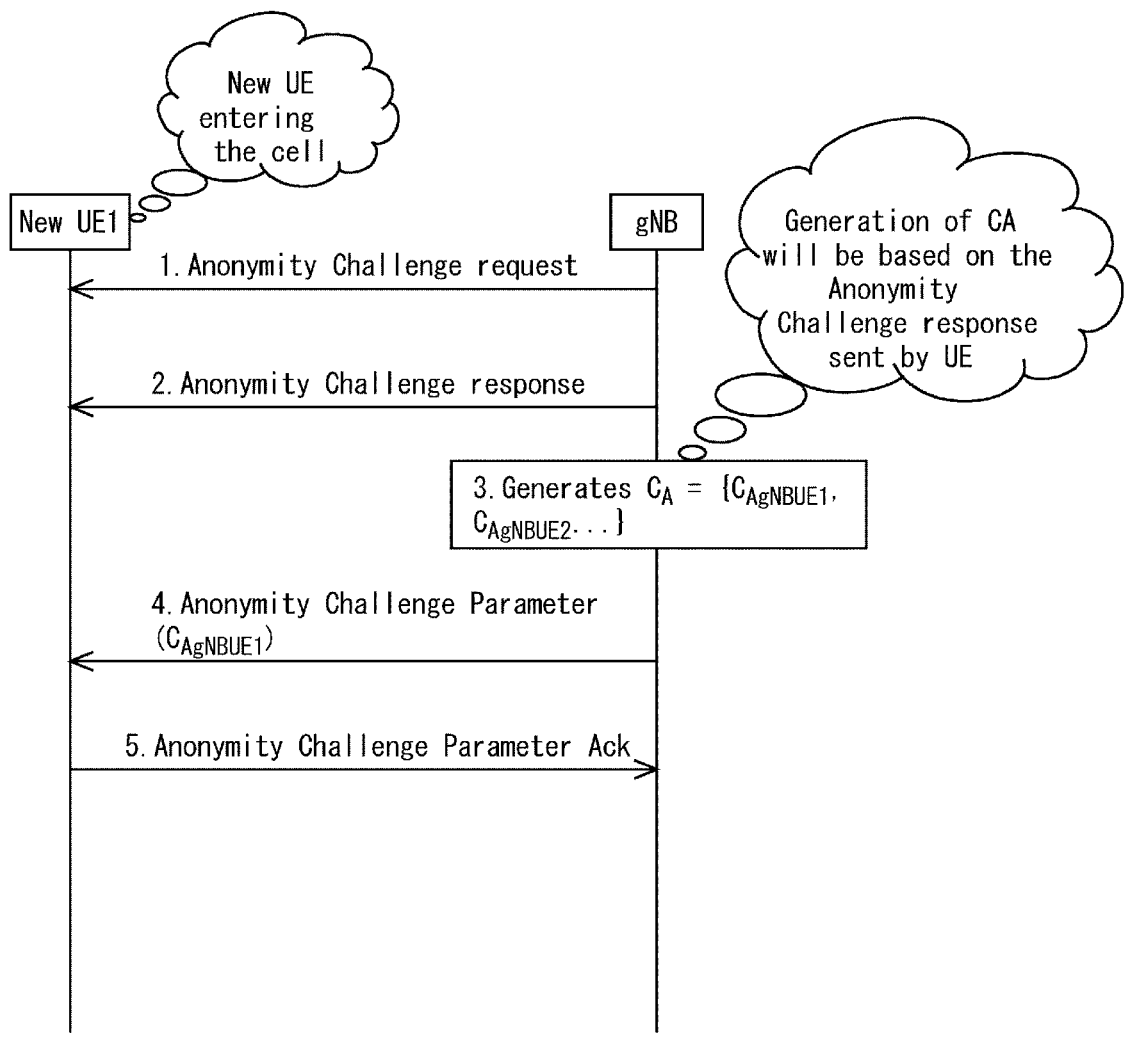
FIG. 12 illustrates a procedure for generation of the $C_A$ by the s-gNB based on the available UEs in the cell, according to an embodiment of the present disclosure.

FIG. 12 illustrates a procedure for generation of the $C_A$ by s-gNB based on the available UEs in the cell, according to an embodiment of the present disclosure. In an embodiment, the procedure is as follows:
1. The gNB sends the Anonymity Challenge Request to the UEs which are connected to the gNB.
2. The UE sends the Anonymity Challenge response (SIB based information) to the gNB.
3. Based on the received response, the gNB generates the unique Anonymity Challenge Parameter for each UE connected to the gNB.
4. After generation of the $C_A$'s, the gNB distributes the $C_A$'s generated for each UE. The $C_A$ for each UE is sent to the UE in the measurement command message sent by the gNB to the UE.
5. On receiving the assigned $C_A$, the UE sends the Anonymity Challenge Parameter acknowledgement as a response.

$C_A$ Distribution During Roaming Scenario

In an embodiment, when the UE switches from one PLMN (HPLMN) to other PLMN (VPLMN), UE sends recently updated $C_A$ parameter list i.e., Access Control List to the UDM. This $C_A$ parameter list is stored along with the UE subscription data in the UDM. When the UE is in VPLMN, the visitor AMF retrieves the $C_A$ parameter list along with the subscription data. Retrieved $C_A$ parameter list is sent to the gNB. In this case, the inventive steps include:
The gNB in the VPLMN has the $C_A$ parameter list of the UE in VPLMN.
The gNB in VPLMN sends Anonymity Challenge Request to the UEs which are connected to it.
This Anonymity Challenge Request contains the UE's $C_A$ parameter list.
The UE verifies the $C_A$ parameter list sent by the gNB, on successful verification UE sends Anonymity Challenge response (SIB based information) to the gNB.
Based on the received response, gNB generates unique Anonymity Challenge Parameter for each UE connected to it.
After Generation of $C_A$'s, gNB Distributes the $C_A$'s Generated for Each of the UE.
The $C_A$ for each of the UE is sent to the UE in measurement command message sent by the gNB to the UE.
On receiving the assigned $C_A$, the UE sends the Anonymity Challenge Parameter acknowledgement as response.

Figure 13:
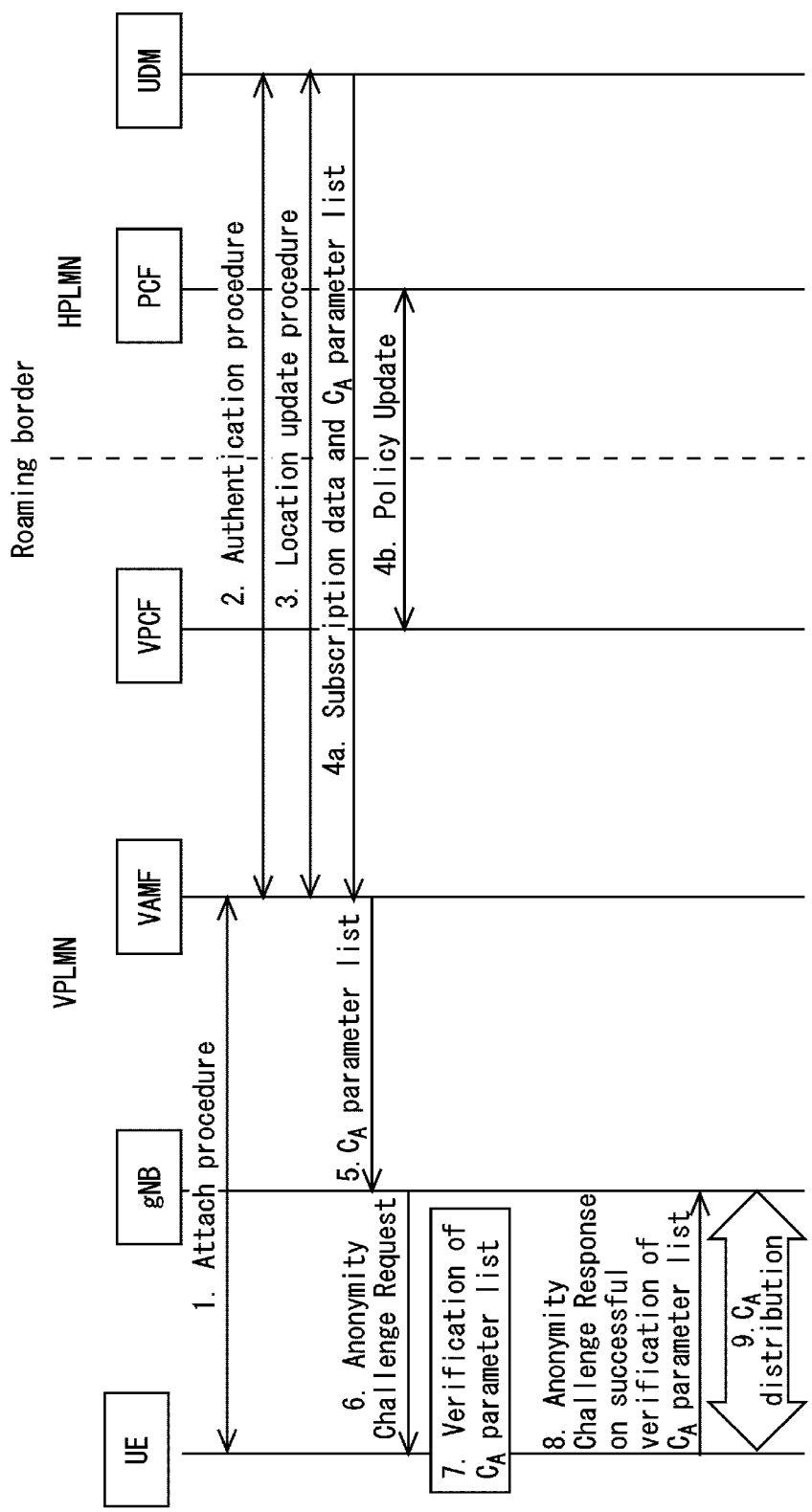
FIG. 13 illustrates a procedure for detecting a false base station during a roaming scenario, according to an embodiment of the present disclosure.

Case1—High Level Call Flow for Detecting a False Base Station During a Roaming Scenario FIG. 13 illustrates a procedure for detecting a false base station during a roaming scenario, according to an embodiment of the present disclosure. In an embodiment, the procedure is as follows:
0. When the UE moves from the Home PLMN to the Visitor PLMN, the UDM stores the UE's $C_A$ parameter list along with the UE subscription data in the HPLMN.
1. The UE in the Visitor PLMN initiates the Attach procedure with the visitor AMF.
2. The visitor AMF at the Visitor PLMN initiates the authentication procedure with the home PLMN.
3. The VAMF also initiates the UE Tracking Area Update procedure with the UDM in the home PLMN.
4. The visitor AMF in the visitor PLMN retrieves the UE's $C_A$ parameter list along with the UE subscription data stored in the UDM at the HPLMN.
5. The VAMF sends the UE's $C_A$ parameter list to the gNB.
6. The source gNB sends the Anonymity challenge request to the UE currently present in the visitor PLMN along with the UE's $C_A$ parameter list retrieved by the VAMF.
7. The UE at the visitor PLMN verifies the $C_A$ parameter list by comparing it with the $C_A$ parameter list present with the UE.
8. On successful verification, the UE sends the Anonymity Challenge Response to the gNB.
9. After reception of the Anonymity Challenge Response by the gNB, the UE and the gNB proceeds with the procedure for generation and distribution of the $C_A$ parameter.

Case2—Roaming Scenario

Figure 14:
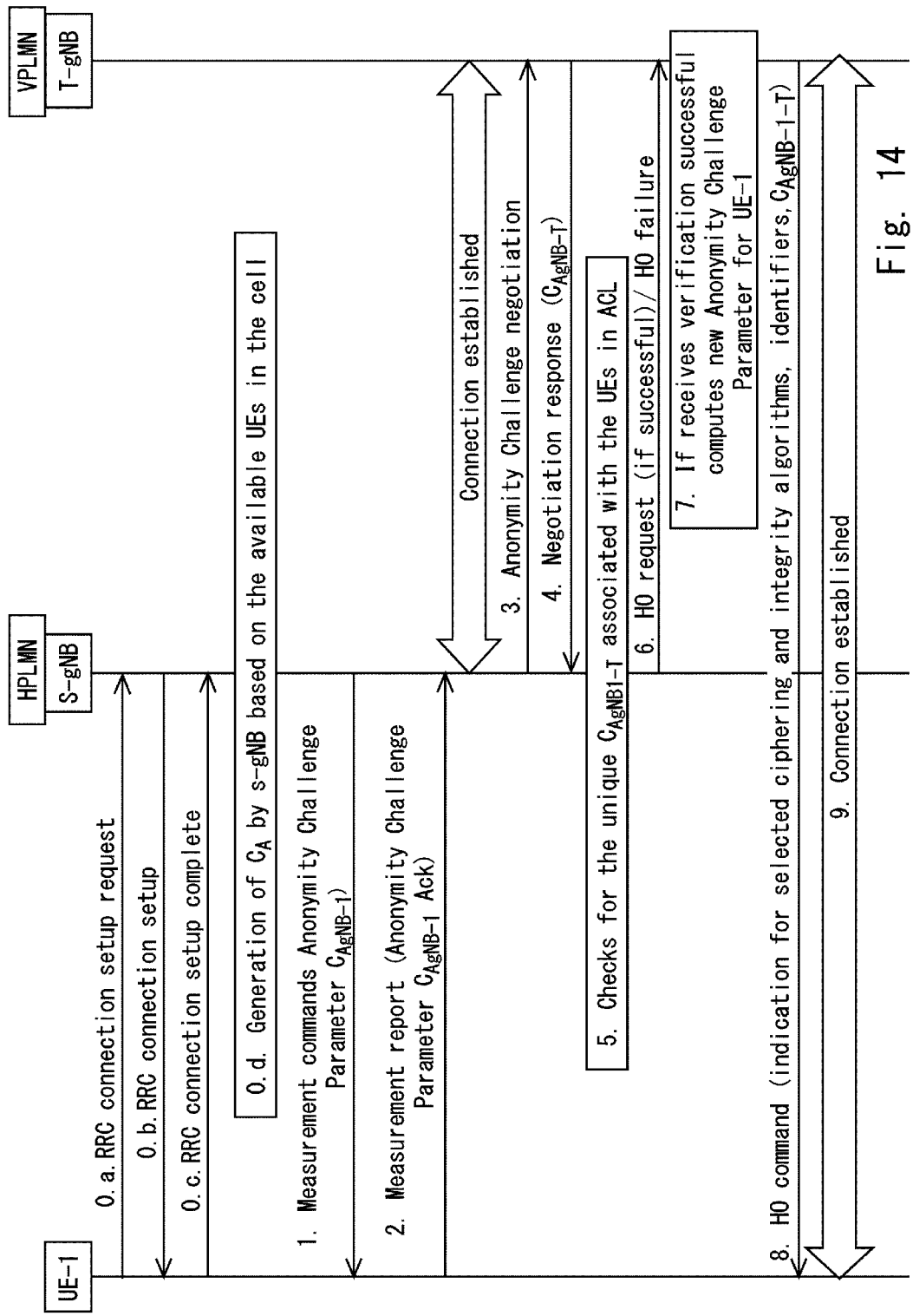
FIG. 14 illustrates a procedure for detecting a false base station during a roaming scenario, according to an embodiment of the present disclosure.

FIG. 14 illustrates a procedure for detecting a false base station during a roaming scenario, according to an embodiment of the present disclosure. In an embodiment, the procedure is as follows:
0. a. The UE sends the RRC connection setup request to the gNB.
0. b. The gNB sends the RRC connection setup message to the UE.
0. c. The UE sends the RRC connection setup complete message as an acknowledgement.
0. d. The gNB generates the Anonymity Challenge Parameter ($C_A$) for all the UEs present in the cell.
1. The gNB sends the UE specific Anonymity Challenge Parameter ($C_A$) to the UE in the Measurement command message.
2. The UE acknowledges the Anonymity Challenge Parameter ($C_A$) by sending the acknowledgement message in the response.
3. When there is a need for handover, the source gNB initiates the Anonymity Challenge negotiation with the target gNB.
4. The target gNB sends the $C_A$ parameter along with the Anonymity Challenge Negotiation response.
5. The source gNB checks for the correlation of the $C_A$ associated with the Cell ID in the Access Control List.
6. If negotiation is successful, the source gNB sends the Handover request to the target gNB and the Handover procedure proceeds as defined in NPL 1.
7. If negotiation fails:
   a. The source gNB sends the target gNB the failure cause message and the source gNB adds the target gNB to the black list or;

b. The timer can be maintained for re-trying to get attached to the same target gNB till the timer expires. After the timer is expired, the source gNB can add the fake gNB Id to the black list or;

c. The service provider may remove the gNB from the black list if the gNB is proven to be genuine or;

d. The source gNB requests the UE to log new Measurement Report.

8. After successful negotiation, the target gNB sends the Handover command message to the UE.

9. The procedure for Xn handover between the source gNB and the target gNB as defined in NPL 1 is followed.

Figure 15:
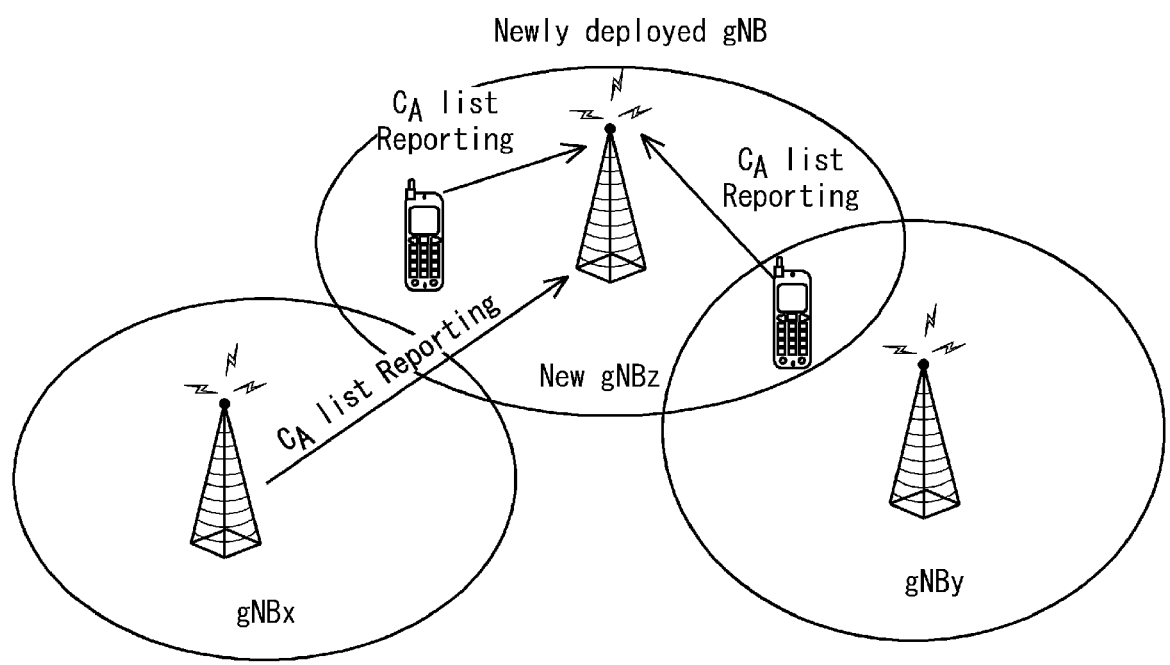
FIG. 15 illustrates the $C_A$ list reporting in Self-Organized Network Configuration of the $C_A$ parameter in newly deployed gNB, according to an embodiment of the present disclosure.

FIG. 15 illustrates $C_A$ list reporting in the Self-Organized Network Configuration of $C_A$ parameter in newly deployed gNB, according to an embodiment of the present disclosure. In an embodiment, the $C_A$ parameter list is configured in a newly deployed gNB. As shown in see FIG. 15, which depicts the procedure for the $C_A$ list reporting in the Self-Organized Network, the procedure is as follows:

Similar to how PCI is sent in the measurement report, the $C_A$ parameter list is sent to the newly deployed gNB.

The newly deployed gNB requests the UEs or the other neighboring gNBs for the $C_A$ list (present in the Access Control List) of the UE or neighboring gNBs.

The new gNB records/updates the $C_A$ list provided by the UEs or neighboring gNBs.

Figure 16:
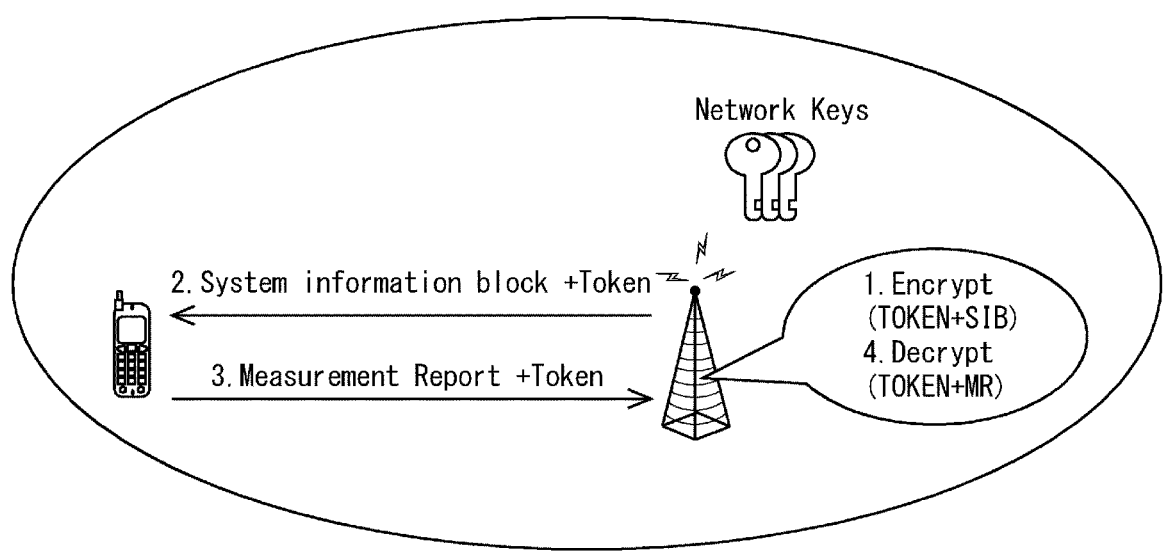
FIG. 16 illustrates a token passing mechanism, according to an embodiment of the present disclosure.

FIG. 16 illustrates a token passing mechanism, according to an embodiment of the present disclosure. In an embodiment, generation of the Secure Token for SIBs is as follows:

Every gNB generates a unique secure token for each broadcasted System Information Block (SIB). The token is encrypted using the Network Key. FIG. 16 gives pictorial description for the Token passing mechanism.

The secure token is generated based on the SIBs information, timestamp, location, etc.

For each broadcasted SIB message, the gNB appends the unique encrypted token.

In an embodiment, protection of the secure token is provided as follows:

The gNB is provisioned with the Private Key and the Public Key.

The secure token sent to the UE is encrypted by the gNB using the Private Key and sent to the UE.

This secure token will be expired once it is used, i.e. cannot be re-used or replayed.

In an embodiment, verification of the secure token is provided as follows:

On receiving SIBs from the gNB, the UE logs the Measurement Report based on the SIB and sends the measurement report with a unique encrypted token to the gNB.

The gNB verifies the encrypted token by decrypting it and validate the token which was generated by the gNB.

In an embodiment, verification of the gNB for preventing the UE from attaching to a false base station is as follows:

With the logged information, nearby genuine gNBs will be able to detect the UEs which were connected to the false cell.

The gNB should send the proximity detection message to the UEs which the gNB is serving.

As a response, the UEs should send the proximity indication to the gNB. It is to be noted that the New Information Element for the $C_A$ parameter can be introduced in the proximity indication message sent by the UE.

The gNB has a log of the UE entering and leaving the cell in the database.

The logged database regarding the UE entering and leaving cell is notified to the other nearby genuine gNBs.

User Equipment (UE)

Figure 17:
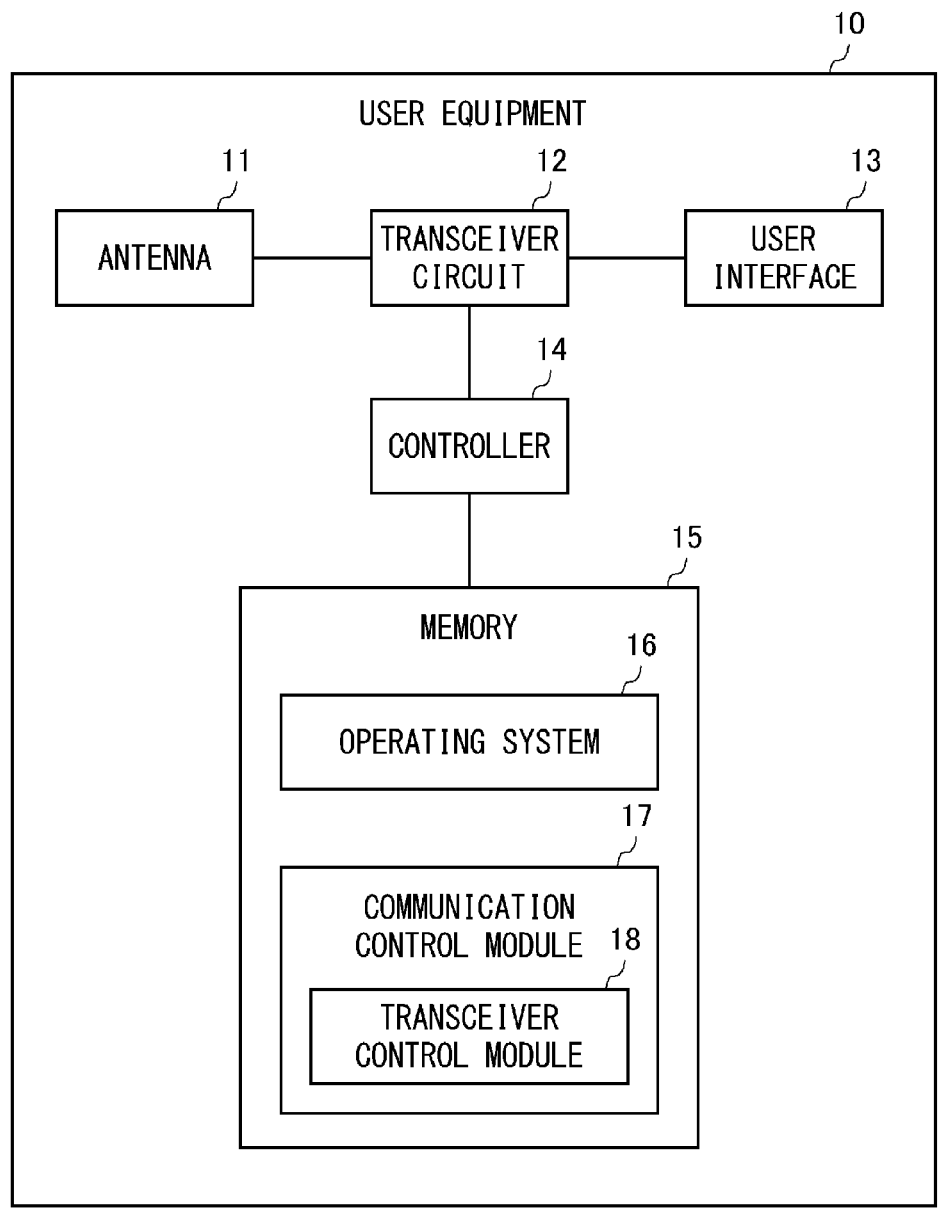
FIG. 17 is a block diagram illustrating main components of the UE, according to an embodiment of the present disclosure.

FIG. 17 is a block diagram illustrating the main components of a UE according to an embodiment of the present disclosure. As shown, the UE 10 includes a transceiver circuit 12 which is operable to transmit signals to and to receive signals from the connected node(s) via one or more antenna 11. Although not necessarily shown in FIG. 17, the UE will of course have all the usual functionality of a common mobile device (such as a user interface 13) and this may be provided by any one or any combination of hardware, software and firmware, as appropriate. Software may be pre-installed in a memory 15 and/or may be downloaded via the telecommunication network or from a removable data storage device (RMD), for example. A controller 14 controls the operation of the UE 10 in accordance with software stored in the memory 15. For example, the controller 14 may be realized by Central Processing Unit (CPU). The software includes, among other things, an operating system 16 and a communications control module 17 having at least a transceiver control module 18. The communications control module (using its transceiver control sub-module) is responsible for handling (generating/sending/receiving) signalling and uplink/downlink data packets between the UE 10 and other nodes, such as the base station/(R)AN node, a MME, the AMF (and other core network nodes). Such signalling may include, for example, appropriately formatted signalling messages relating to connection establishment and maintenance (e.g. RRC messages), NAS messages such as periodic location update related messages (e.g. tracking area update, paging area updates, location area update) etc.

(R)AN Node

Figure 18:
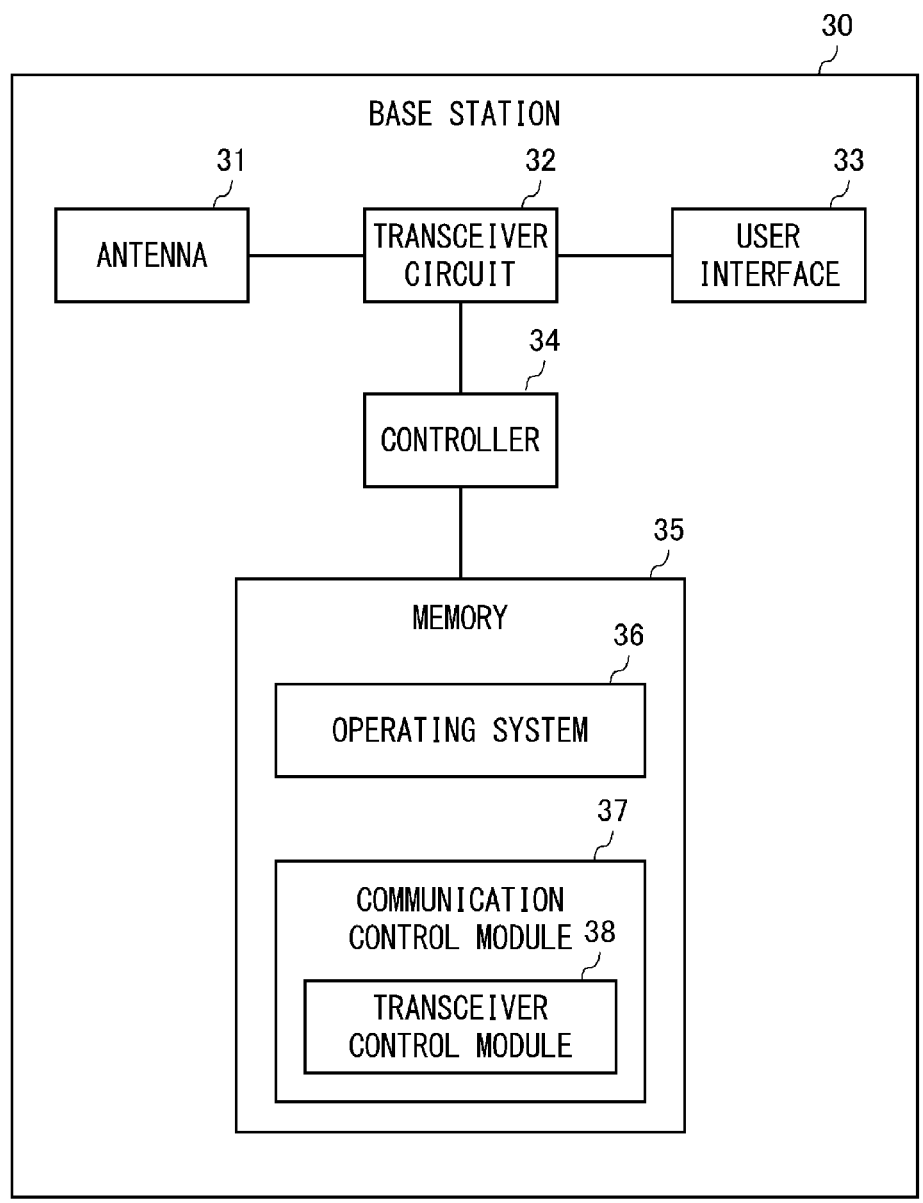
FIG. 18 is a block diagram illustrating main components of the base station or RAN node, according to an embodiment of the present disclosure.

FIG. 18 is a block diagram illustrating the main components of an exemplary (R)AN node, for example a base station ('eNB' in LTE, 'gNB' in 5G) according to an embodiment of the present disclosure. As shown, the (R)AN node 30 includes a transceiver circuit 32 which is operable to transmit signals to and to receive signals from connected the UE(s) via one or more antenna 31 and to transmit signals to and to receive signals from other network nodes (either directly or indirectly) via a network interface 33. A controller 34 controls the operation of the (R)AN node 30 in accordance with software stored in a memory 35. For example, the controller 34 may be realized by Central Processing Unit (CPU). Software may be pre-installed in the memory 35 and/or may be downloaded via the telecommunication network or from a removable data storage device (RMD), for example. The software includes, among other things, an operating system 36 and a communications control module 37 having at least a transceiver control module 38. The communications control module 37 (using its transceiver control sub-module) is responsible for handling (generating/sending/receiving) signalling between the (R)AN node 30 and other nodes, such as the UE, the MME, the AMF (e.g. directly or indirectly). The signalling may include, for example, appropriately formatted signalling messages relating to a radio connection and location procedures (for a particular UE), and in particular, relating to connection establishment and maintenance (e.g. RRC connection establishment and other RRC messages), periodic location update related messages (e.g. tracking area update, paging area updates, location area update), S1 AP messages and NG AP messages (i.e. messages by N2 reference point), etc. Such signalling may also include, for example, broadcast information (e.g. Master Information and System information) in a sending case. The controller 34 is also configured (by software or hardware) to handle related tasks such as, when implemented, UE mobility estimate and/or moving trajectory estimation.

Core Network Node

Figure 19:
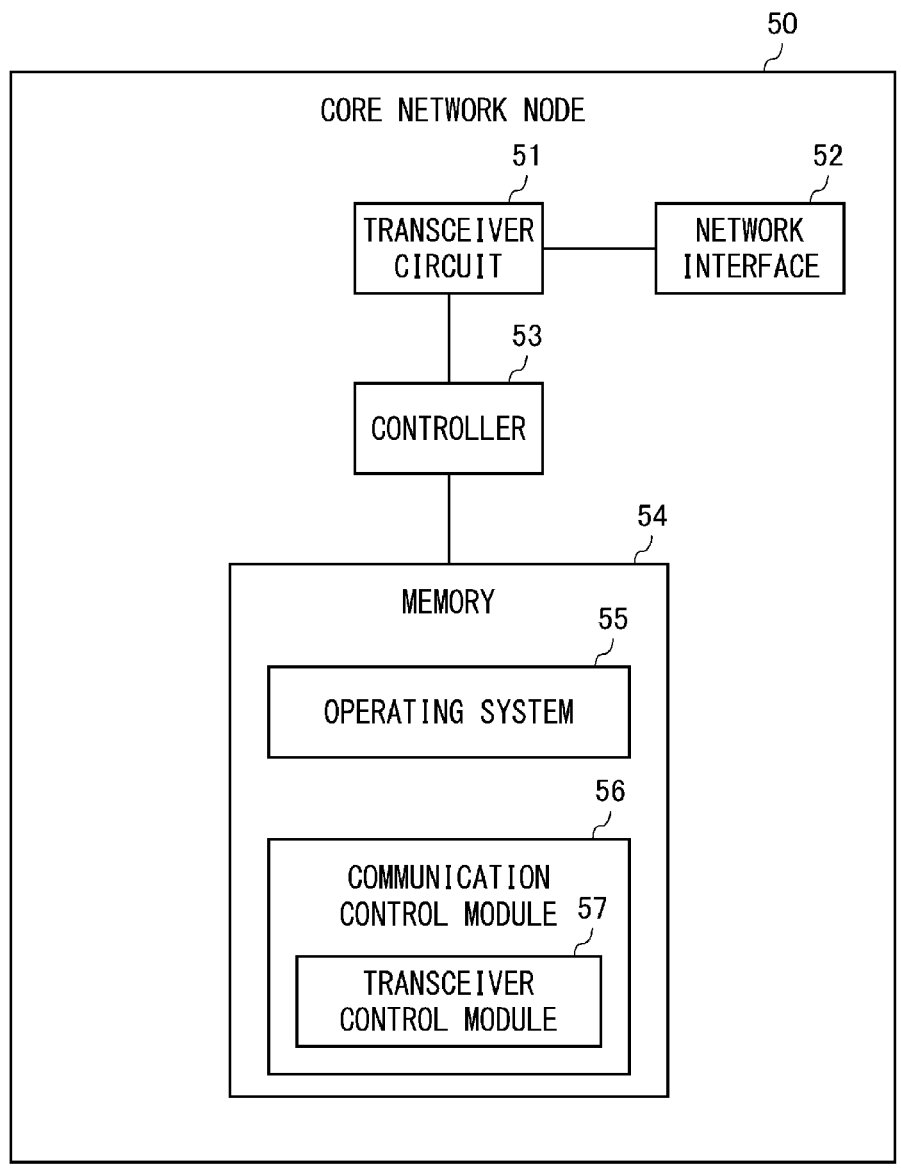
FIG. 19 is a block diagram illustrating main components of the Core Network node, according to an embodiment of the present disclosure.

FIG. 19 is a block diagram illustrating the main components of an exemplary core network node, for example an AMF, a SEAF, a SMF, an UPF, an UDM (Unified Data Management), an AUSF or any other core network node according to an embodiment of the present disclosure. The AMF may include a SEAF. The AMF provides mobility management and registration management in the network. The AMF can also be called a mobility management node. The SEAF can be called a security anchor function. The SEAF provides the storage and management of an anchor key in the network. The SMF provides session management e.g. session establishment, modify and release, in the network. The SMF can also be called as session management node. The UPF provides user data between the UE and each application. The UPF can also be called as gateway node. The UDM is a subscriber registration. The UDM may include an ARPF (Authentication credential Repository and Processing Function) as a credential storage. The UDM may also include a SIDF (Subscription Identifier De-Concealing Function) for providing a service for de-concealing of the concealed permanent identifier. The AUSF is an authentication function. The AUSF provides a front end to the UDM. The AUSF may include a storage for storing an anchor key. The UDM and/or the combination of any of UDM/ARPF/SIDF can be called a subscriber database. The core network node 50 is included in the 5GC. As shown, the core network node 50 includes a transceiver circuit 51 which is operable to transmit signals to and to receive signals from other nodes (including the UE) via a network interface 52. A controller 53 controls the operation of the core network node 50 in accordance with software stored in a memory 54. For example, the controller 50 may be realized by Central Processing Unit (CPU). Software may be pre-installed in the memory 54 and/or may be downloaded via the telecommunication network or from a removable data storage device (RMD), for example. The software includes, among other things, an operating system 55 and a communications control module 56 having at least a transceiver control module 57. The communications control module 56 (using its transceiver control sub-module) is responsible for handling (generating/sending/receiving) signalling between the core network node 50 and other nodes, such as the UE, base station/(R)AN node (e.g. "gNB" or "eNB") (directly or indirectly). Such signalling may include, for example, appropriately formatted signalling messages relating to the procedures described herein, for example, NG AP message (i.e. a message by N2 reference point) to convey an NAS message from and to the UE, etc.

The User Equipment (or "UE", "mobile station", "mobile device" or "wireless device") in the present disclosure is an entity connected to a network via a wireless interface.

It should be noted that the UE in this specification is not limited to a dedicated communication device, and can be applied to any device, having a communication function as a UE described in this specification, as explained in the following paragraphs.

The terms "User Equipment" or "UE" (as the term is used by 3GPP), "mobile station", "mobile device", and "wireless device" are generally intended to be synonymous with one another, and include standalone mobile stations, such as terminals, cell phones, smart phones, tablets, cellular IoT devices, IoT devices, and machinery.

It will be appreciated that the terms "UE" and "wireless device" also encompass devices that remain stationary for a long period of time.

A UE may, for example, be an item of equipment for production or manufacture and/or an item of energy related machinery (for example equipment or machinery such as: boilers; engines; turbines; solar panels; wind turbines; hydroelectric generators; thermal power generators; nuclear electricity generators; batteries; nuclear systems and/or associated equipment; heavy electrical machinery; pumps including vacuum pumps; compressors; fans; blowers; oil hydraulic equipment; pneumatic equipment; metal working machinery; manipulators; robots and/or their application systems; tools; molds or dies; rolls; conveying equipment; elevating equipment; materials handling equipment; textile machinery; sewing machines; printing and/or related machinery; paper converting machinery; chemical machinery; mining and/or construction machinery and/or related equipment; machinery and/or implements for agriculture, forestry and/or fisheries; safety and/or environment preservation equipment; tractors; precision bearings; chains; gears; power transmission equipment; lubricating equipment; valves; pipe fittings; and/or application systems for any of the previously mentioned equipment or machinery etc.).

A UE may, for example, be an item of transport equipment (for example transport equipment such as: rolling stocks; motor vehicles; motor cycles; bicycles; trains; buses; carts; rickshaws; ships and other watercraft; aircraft; rockets; satellites; drones; balloons etc.).

A UE may, for example, be an item of information and communication equipment (for example information and communication equipment such as: electronic computer and related equipment; communication and related equipment; electronic components etc.).

A UE may, for example, be a refrigerating machine, a refrigerating machine applied product, an item of trade and/or service industry equipment, a vending machine, an automatic service machine, an office machine or equipment, a consumer electronic and electronic appliance (for example a consumer electronic appliance such as: audio equipment; video equipment; a loud speaker; a radio; a television; a microwave oven; a rice cooker; a coffee machine; a dishwasher; a washing machine; a dryer; an electronic fan or related appliance; a cleaner etc.).

A UE may, for example, be an electrical application system or equipment (for example an electrical application system or equipment such as: an x-ray system; a particle accelerator; radio isotope equipment; sonic equipment; electromagnetic application equipment; electronic power application equipment etc.).

A UE may, for example, be an electronic lamp, a luminaire, a measuring instrument, an analyzer, a tester, or a surveying or sensing instrument (for example a surveying or sensing instrument such as: a smoke alarm; a human alarm sensor; a motion sensor; a wireless tag etc.), a watch or clock, a laboratory instrument, optical apparatus, medical equipment and/or system, a weapon, an item of cutlery, a hand tool, or the like.

A UE may, for example, be a wireless-equipped personal digital assistant or related equipment (such as a wireless card or module designed for attachment to or for insertion into another electronic device (for example a personal computer, electrical measuring machine)).

A UE may be a device or a part of a system that provides applications, services, and solutions described below, as to "internet of things (IoT)", using a variety of wired and/or wireless communication technologies.

Internet of Things devices (or "things") may be equipped with appropriate electronics, software, sensors, network connectivity, and/or the like, which enable these devices to collect and exchange data with each other and with other communication devices. IoT devices may include automated equipment that follow software instructions stored in an internal memory. IoT devices may operate without requiring human supervision or interaction. IoT devices might also remain stationary and/or inactive for a long period of time. IoT devices may be implemented as a part of a (generally) stationary apparatus. IoT devices may also be embedded in non-stationary apparatus (e.g. vehicles) or attached to animals or persons to be monitored/tracked.

It will be appreciated that IoT technology can be implemented on any communication devices that can connect to a communications network for sending/receiving data, regardless of whether such communication devices are controlled by human input or software instructions stored in memory.

It will be appreciated that IoT devices are sometimes also referred to as Machine-Type Communication (MTC) devices or Machine-to-Machine (M2M) communication devices or Narrow Band-IoT UE (NB-IoT UE). It will be appreciated that a UE may support one or more IoT or MTC applications. Some examples of MTC applications are listed in the following table (source: 3GPP TS 22.368 V13.1.0, Annex B, the contents of which are incorporated herein by reference). This list is not exhaustive and is intended to be indicative of some examples of machine-type communication applications.

TABLE 1

Some examples of machine type communication applications.

| Service Area | MTC applications |
| --- | --- |
| Security | Surveillance systems |
| | Backup for landline |
| | Control of physical access |
| | (e.g. to buildings) |
| | Car/driver security |
| Tracking & Tracing | Fleet Management |
| | Order Management |
| | Pay as you drive |
| | Asset Tracking |
| | Navigation |
| | Traffic information |
| | Road tolling |
| | Road traffic optimisation/steering |
| Payment | Point of sales |
| | Vending machines |
| | Gaming machines |
| Health | Monitoring vital signs |
| | Supporting the aged or handicapped |
| | Web Access Telemedicine points |
| | Remote diagnostics |
| Remote Maintenance/Control | Sensors |
| | Lighting |
| | Pumps |
| | Valves |
| | Elevator control |
| | Vending machine control |
| | Vehicle diagnostics |

TABLE 1-continued

Some examples of machine type communication applications.

| Service Area | MTC applications |
| --- | --- |
| Metering | Power |
| | Gas |
| | Water |
| | Heating |
| | Grid control |
| | Industrial metering |
| Consumer Devices | Digital photo frame |
| | Digital camera |
| | eBook |

Applications, services, and solutions may be an MVNO (Mobile Virtual Network Operator) service, an emergency radio communication system, a PBX (Private Branch eXchange) system, a PHS/Digital Cordless Telecommunications system, a POS (Point of sale) system, an advertise calling system, an MBMS (Multimedia Broadcast and Multicast Service), a V2X (Vehicle to Everything) system, a train radio system, a location related service, a Disaster/Emergency Wireless Communication Service, a community service, a video streaming service, a femto cell application service, a VoLTE (Voice over LTE) service, a charging service, a radio on demand service, a roaming service, an activity monitoring service, a telecom carrier/communication NW selection service, a functional restriction service, a PoC (Proof of Concept) service, a personal information management service, an ad-hoc network/DTN (Delay Tolerant Networking) service, etc.

Further, the above-described UE categories are merely examples of applications of the technical ideas and exemplary embodiments described in the present document. Needless to say, these technical ideas and embodiments are not limited to the above-described UE and various modifications can be made thereto.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

ABBREVIATIONS

For the purposes of the present document, the abbreviations given in NPL 4 and the following apply. An abbreviation defined in the present document takes precedence over the definition of the same abbreviation, if any, in NPL 4.

5GC 5G Core Network
5GS 5G System
5G-AN 5G Access Network
5G-GUTI 5G Globally Unique Temporary Identifier
5G S-TMSI 5G S-Temporary Mobile Subscription Identifier
AMF Access and Mobility Management Function
AN Access Node AS Access Stratum
AUSF Authentication Server Function
CP Control Plane
CM Connection Management
DL Downlink
DN Data Network
DNAI DN Access Identifier
DNN Data Network Name
ECIES Elliptic Curve Integrated Encryption Scheme (ECIES)
EPC Evolved Packet Core
FQDN Fully Qualified Domain Name
GPSI Generic Public Subscription Identifier
GUAMI Globally Unique AMF Identifier
HR Home Routed (roaming)
KDF Key Derivation Function
MAC Medium Access Control
MME Mobility Management Entity
N3IWF Non-3GPP Inter Working Function
NAI Network Access Identifier
NAS Non-Access Stratum
NEF Network Exposure Function
NF Network Function
NG-RAN Next Generation Radio Access Network
NR New Radio
NRF Network Repository Function
PLMN Public land mobile network
PPD Paging Policy Differentiation
(R)AN (Radio) Access Network
RLC Radio Link Control
RRC Radio Resource Control
SBA Service Based Architecture
SEAF Security Anchor Functionality
SMF Session Management Function
S-NSSAI Single Network Slice Selection Assistance Information
SUCI Subscription Concealed Identifier
SUPI Subscription Permanent Identifier
UPF User Plane Function
UDR Unified Data Repository For example, all or some of the embodiments disclosed above can be described like in, but not limited to, the following supplementary notes.

(Supplementary Note 1)

A method performed by a source base station, the method comprising:
generating a User Equipment (UE) specific anonymity challenge parameter to the UE based on sensitive information from the UE, cell information, source base station information and an initial anonymity challenge parameter assigned to a particular base station;
sending a measurement command message including the UE specific anonymity challenge parameter to the UE;
receiving an anonymity challenge parameter acknowledgement as a response from the UE;
negotiating the UE specific anonymity challenge parameter with the UE to prevent the UE from attaching to a false base station.

(Supplementary Note 2)

The method according to supplementary note 1, wherein the UE specific anonymity challenge parameter is generated by at least one of a pseudo random number generator (PRNG) and any options using sensitive system information blocks (SIBs) sent by the UE.

(Supplementary Note 3)

The method according to supplementary note 1, wherein the anonymity challenge parameter is generated by the source base station only when the UE is in a radio resource control (RRC) connected mode and only for a new UE entering a cell associated with the source base station, wherein information of the UE entering and leaving the cell is sent to the source base station in a proximity indication message sent by the UE to the source base station.

(Supplementary Note 4)

The method according to supplementary note 3, wherein the source base station deletes the anonymity challenge parameter assigned to the UE leaving the cell based on the proximity indication message.

(Supplementary Note 5)

The method according to supplementary note 1, wherein negotiating, by the source base station, the UE specific anonymity challenge parameter with the UE to prevent the UE from attaching to a false base station comprises:
determining, by the source base station, to perform a handover procedure from the source base station to a target base station;
sending, by the source base station, an anonymity challenge negotiation request to the target base station;
receiving, by the source base station, an anonymity challenge negotiation response including a target base station specific anonymity challenge parameter from the target base station;
negotiating, by the source base station, by determining a correlation of an anonymity challenge parameter associated with an identifier of the cell and target base station related information in an access control list of the source base station;
performing one of:
sending, by the source base station, a handover request to the target base station with a security context in response to determining that the negotiation is successful based on the correlation, and
sending, by the source base station, a target base station failure cause message considering the target base station as a fake base station in response to determining that the negotiation is unsuccessful based on the correlation.

(Supplementary Note 6)

The method according to supplementary note 5, wherein when the negotiation is unsuccessful, the source base station performs at least one of adding the target base station to a black list, initiating a timer for re-trying to attach the UE to the target base station till the timer is expired and, after expiry of the timer, adding the target base station to a black list or, removing the target base station from the black list if the target base station is proven to be genuine, and requesting the UE to log a new measurement report.

(Supplementary Note 7)

The method according to supplementary note 5, wherein the source base station has information about the anonymity challenge parameter of neighboring base stations and the anonymity challenge parameter assigned to UEs by neighboring base stations.

(Supplementary Note 8)

The method according to supplementary note 5, wherein the target base station related information in the access control list comprising UE specific anonymity challenge parameter associated with a cell identifier of the target base station.

(Supplementary Note 9)

The method according to supplementary note 5, wherein when the source base station receives the anonymity challenge parameter in the anonymity challenge negotiation response, the source base station checks for the correlation between the anonymity challenge parameter sent by the target base station and the anonymity challenge parameter associated with at least one of a target cell identifier, a target public land mobile network (PLMN) identifier, a tracking area code (TAC), a neighboring cell list, UE history information, and mobility information present in the access control list of the source base station.

(Supplementary Note 10)

The method according to supplementary note 5, wherein when the source base station receives the anonymity challenge parameter in the anonymity challenge negotiation response, the source base station checks for the UE specific anonymity challenge parameter and UE history information including at least one of a last visited cell, a cell identifier, a cell type, a time UE stayed in the cell, and a handover cause.

(Supplementary Note 11)

A method performed by a User Equipment (UE), the method comprising:
receiving a measurement command message including an anonymity challenge parameter from a source base station;
sending a UE specific anonymity challenge parameter acknowledgement as a response to the source base station;
mapping the UE specific Anonymity challenge parameter with an identifier of a cell on which the UE is camped and information associated with the source base station;
updating an access control list available at the UE based on the mapping to prevent the UE from attaching to a false base station.

(Supplementary Note 12)

The method according to supplementary note 11, wherein the UE erases the anonymity challenge parameter stored in a database when the UE enters into a power-off mode.

(Supplementary Note 13)

A source base station, wherein the source base station is configured to implement the steps as recited in any one of the supplementary notes 1-10.

(Supplementary Note 14)

A user equipment (UE), wherein the UE is configured to implement the steps as recited in any one of the supplementary notes 11-12.

This application is based upon and claims the benefit of priority from Indian patent applications No. 201941001322, filed on Jan. 11, 2019, the disclosure of which is incorporated herein in its entirety by reference.

REFERENCE SIGNS LIST

10 UE
11 ANTENNA
12 TRANSCEIVER CIRCUIT
13 USER INTERFACE
14 CONTROLLER
15 MEMORY
16 OPERATING SYSTEM
17 COMMUNICATIONS CONTROL MODULE
18 TRANSCEIVER CONTROL MODULE
30 (R)AN NODE
31 ANTENNA
32 TRANSCEIVER CIRCUIT
33 NETWORK INTERFACE
34 CONTROLLER
35 MEMORY
36 OPERATING SYSTEM
37 COMMUNICATIONS CONTROL MODULE
38 TRANSCEIVER CONTROL MODULE
50 CORE NETWORK NODE
51 TRANSCEIVER CIRCUIT
52 NETWORK INTERFACE
53 CONTROLLER
54 MEMORY
55 OPERATING SYSTEM
56 COMMUNICATIONS CONTROL MODULE
57 TRANSCEIVER CONTROL MODULE

What is claimed is:

1. A method performed by a Next Generation Radio Access Network (NG-RAN) node that is an eNB node, the eNB node being connected via an N2 reference point to an Access and Mobility Management (AMF) node, the method comprising:
sending, to a User Equipment (UE), a System Information Block (SIB) message including first information related to a secure token, wherein the secure token is generated based on the SIB message;
receiving, from the UE that received the SIB message, a message including second information related to the secure token;
verifying the secure token using a security key; and
validating the secure token.

2. The method according to claim 1, wherein the secure token is generated using SIB information.

3. A Next Generation Radio Access Network (NG-RAN) node that is an eNB node, the eNB node being connected via an N2 reference point to an Access and Mobility Management Function (AMF) node, the NG-RAN node comprising:
one or more memories storing instructions; and
one or more processors configured to process the instruction to:
send, to a User Equipment (UE), a System Information Block (SIB) message including first information related to a secure token, wherein the secure token is generated based on the SIB message;
receive, from the UE that received the SIB message, a message including second information related to the secure token;
verify the secure token using a security key; and
validate the secure token.

* * * * *